US012078961B2

(12) United States Patent
Mizoguchi et al.

(10) Patent No.: US 12,078,961 B2
(45) Date of Patent: Sep. 3, 2024

(54) TONER, METHOD OF MANUFACTURING TONER, TONER STORAGE UNIT, IMAGE FORMING APPARATUS AND METHOD OF FORMING IMAGE

(71) Applicants: Yuka Mizoguchi, Shizuoka (JP); Hiroshi Yamashita, Shizuoka (JP); Junichi Watanabe, Shizuoka (JP); Tomomi Harashima, Kanagawa (JP)

(72) Inventors: Yuka Mizoguchi, Shizuoka (JP); Hiroshi Yamashita, Shizuoka (JP); Junichi Watanabe, Shizuoka (JP); Tomomi Harashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 17/407,266

(22) Filed: Aug. 20, 2021

(65) Prior Publication Data

US 2022/0057726 A1 Feb. 24, 2022

(30) Foreign Application Priority Data

Aug. 24, 2020 (JP) ................................ 2020-140795

(51) Int. Cl.

| | |
|---|---|
| ***G03G 9/08*** | (2006.01) |
| ***G03G 9/087*** | (2006.01) |
| ***G03G 15/08*** | (2006.01) |

(52) U.S. Cl.
CPC ....... *G03G 9/08755* (2013.01); *G03G 9/0804* (2013.01); *G03G 9/0821* (2013.01); *G03G 9/08711* (2013.01); *G03G 15/0813* (2013.01)

(58) Field of Classification Search
None
See application file for complete search history.

(56) References Cited

U.S. PATENT DOCUMENTS

| | | | |
|---|---|---|---|
| 4,620,987 | A | 11/1986 | Yamashita et al. |
| 4,885,350 | A | 12/1989 | Yamashita et al. |
| 5,368,972 | A | 11/1994 | Yamashita et al. |

(Continued)

FOREIGN PATENT DOCUMENTS

| | | | |
|---|---|---|---|
| JP | 2012-063496 | 3/2012 | |
| JP | 2012042939 A * | 3/2012 | .......... G03G 9/0804 |

(Continued)

OTHER PUBLICATIONS

JP-5949812-B2 Translation (Year: 2023).*

(Continued)

*Primary Examiner* — Peter L Vajda
*Assistant Examiner* — Charles Collins Sullivan, IV
(74) *Attorney, Agent, or Firm* — Grüneberg and Myers PLLC

(57) ABSTRACT

A toner includes a crystalline polyester resin and an amorphous polyester resin. A ratio of the storage modulus of the toner G' ($T_o$) at a temperature $T_o$ to the storage modulus of the toner G' ($T_o$+3) at a temperature $T_o$+3 is greater than or equal to 10, in a case where the temperature $T_o$ is within a range from 50° C. to 65° C.

12 Claims, 1 Drawing Sheet

(56) References Cited

U.S. PATENT DOCUMENTS

| | | | | |
|---|---|---|---|---|
| 5,541,031 | A | 7/1996 | Yamashita et al. | |
| 5,565,298 | A | 10/1996 | Suguro et al. | |
| 5,576,393 | A | 11/1996 | Yamashita et al. | |
| 5,648,842 | A | 7/1997 | Sekine et al. | |
| 6,125,257 | A | 9/2000 | Sekine et al. | |
| 6,140,000 | A | 10/2000 | Yamashita | |
| 6,255,028 | B1 | 7/2001 | Hasagawa et al. | |
| 6,329,115 | B1 | 12/2001 | Yamashita | |
| 6,360,068 | B1 | 3/2002 | Kinoshita et al. | |
| 6,403,275 | B1 | 6/2002 | Kuramoto et al. | |
| 6,416,914 | B1 | 7/2002 | Nakamura et al. | |
| 6,432,589 | B1 | 8/2002 | Uchinokura et al. | |
| 6,503,676 | B2 | 1/2003 | Yamashita et al. | |
| 6,632,579 | B1 | 10/2003 | Yamashita | |
| 6,660,443 | B2 | 12/2003 | Sugiyama et al. | |
| 6,682,866 | B2 | 1/2004 | Sugiyama et al. | |
| 6,737,210 | B2 | 5/2004 | Uchinokura et al. | |
| 6,740,460 | B2 | 5/2004 | Tomita et al. | |
| 6,756,175 | B2 | 6/2004 | Emoto et al. | |
| 6,787,280 | B2 | 9/2004 | Yamashita et al. | |
| 6,800,412 | B2 | 10/2004 | Sugiyama et al. | |
| 6,824,945 | B2 | 11/2004 | Emoto et al. | |
| 6,835,519 | B2 | 12/2004 | Sugiyama et al. | |
| 6,846,604 | B2 | 1/2005 | Emoto et al. | |
| 6,849,369 | B2 | 2/2005 | Yagi et al. | |
| 6,852,462 | B2 | 2/2005 | Emoto et al. | |
| 6,855,468 | B1 | 2/2005 | Yamamoto et al. | |
| 6,946,229 | B2 | 9/2005 | Suzuki et al. | |
| 7,005,223 | B2 | 2/2006 | Yamashita et al. | |
| 7,074,535 | B2 | 7/2006 | Salto et al. | |
| 7,074,541 | B2 | 7/2006 | Yamashita et al. | |
| 7,110,710 | B2 | 9/2006 | Yamashita et al. | |
| 7,198,874 | B2 | 4/2007 | Saito et al. | |
| 7,214,461 | B2 | 5/2007 | Yamashita et al. | |
| 7,241,548 | B2 | 7/2007 | Sugiyama et al. | |
| 7,294,443 | B2 | 11/2007 | Yamashita et al. | |
| 7,364,828 | B2 | 4/2008 | Yamashita et al. | |
| 7,384,722 | B2 | 6/2008 | Ohtani et al. | |
| 7,396,630 | B2 | 7/2008 | Watanabe et al. | |
| 7,419,756 | B2 | 9/2008 | Yamashita et al. | |
| 7,435,521 | B2 | 10/2008 | Yagi et al. | |
| 7,455,942 | B2 | 11/2008 | Nagatomo et al. | |
| 7,541,128 | B2 | 6/2009 | Watanabe et al. | |
| 7,560,216 | B2 | 7/2009 | Sugiyama et al. | |
| 7,563,555 | B2 | 7/2009 | Watanabe et al. | |
| 7,629,099 | B2 | 12/2009 | Yamashita et al. | |
| 7,666,566 | B2 | 2/2010 | Ohtani et al. | |
| 7,709,174 | B2 | 5/2010 | Sugimoto et al. | |
| 7,824,835 | B2 | 11/2010 | Sugimoto et al. | |
| 7,858,280 | B2 | 12/2010 | Sugimoto et al. | |
| 7,879,523 | B2 | 2/2011 | Yamashita et al. | |
| 7,932,007 | B2 | 4/2011 | Yamashita et al. | |
| 7,939,238 | B2 | 5/2011 | Yamashita et al. | |
| 7,947,419 | B2 | 5/2011 | Sugimoto et al. | |
| 7,968,265 | B2 | 6/2011 | Sugimoto et al. | |
| 8,012,660 | B2 | 9/2011 | Yamashita et al. | |
| 8,017,292 | B2 | 9/2011 | Sabu et al. | |
| 8,114,560 | B2 | 2/2012 | Nakayama et al. | |
| 8,163,455 | B2 | 4/2012 | Watanabe et al. | |
| 8,178,268 | B2 | 5/2012 | Watanabe et al. | |
| 8,187,784 | B2 | 5/2012 | Yamashita et al. | |
| 8,227,164 | B2 | 7/2012 | Sugimoto et al. | |
| 8,293,442 | B2 | 10/2012 | Watanabe et al. | |
| 8,361,690 | B2 | 1/2013 | Sakaguchi et al. | |
| 8,455,172 | B2 | 6/2013 | Awamura et al. | |
| 8,486,596 | B2 | 7/2013 | Watanabe et al. | |
| 8,501,379 | B2 | 8/2013 | Sugimoto et al. | |
| 8,546,056 | B2 | 10/2013 | Chiba et al. | |
| 8,557,491 | B2 | 10/2013 | Sugimoto et al. | |
| 8,568,951 | B2 | 10/2013 | Watanabe et al. | |
| 8,557,497 | B2 | 11/2013 | Watanabe et al. | |
| 8,592,113 | B2 | 11/2013 | Watanabe et al. | |
| 8,592,117 | B2 | 11/2013 | Sugimoto et al. | |
| 8,603,719 | B2 | 12/2013 | Yamashita et al. | |
| 8,614,043 | B2 | 12/2013 | Watanabe et al. | |
| 8,673,528 | B2 | 3/2014 | Sugimoto et al. | |
| 8,728,700 | B2 | 5/2014 | Watanabe et al. | |
| 8,728,703 | B2 | 5/2014 | Yamashita et al. | |
| 8,735,037 | B2 | 5/2014 | Yamashita et al. | |
| 8,771,914 | B2 | 7/2014 | Kotsugal et al. | |
| 8,795,940 | B2 | 8/2014 | Sugimoto et al. | |
| 8,846,289 | B2 | 9/2014 | Ogawa et al. | |
| 8,871,418 | B2 | 10/2014 | Sugiura et al. | |
| 8,883,385 | B2 | 11/2014 | Sakashita et al. | |
| 8,889,330 | B2 | 11/2014 | Sugiura et al. | |
| 8,895,217 | B2 | 11/2014 | Asahina et al. | |
| 8,932,788 | B2 | 1/2015 | Wakamatsu et al. | |
| 8,932,789 | B2 | 1/2015 | Sugimoto et al. | |
| 8,986,916 | B2 | 3/2015 | Yamashita et al. | |
| 9,012,117 | B2 | 4/2015 | Nakajima et al. | |
| 9,034,548 | B2 | 5/2015 | Moritani et al. | |
| 9,034,550 | B2 | 5/2015 | Mizoguchi et al. | |
| 9,052,621 | B2 | 6/2015 | Kusahara et al. | |
| 9,063,446 | B2 | 6/2015 | Miyaake et al. | |
| 9,152,067 | B2 | 10/2015 | Chiba et al. | |
| 9,152,069 | B2 | 10/2015 | Watanabe et al. | |
| 9,176,406 | B2 | 11/2015 | Sekiguchi et al. | |
| 9,207,553 | B2 | 12/2015 | Sugimoto et al. | |
| 9,239,530 | B2 | 1/2016 | Asahina et al. | |
| 9,341,971 | B2 | 5/2016 | Mizoguchi et al. | |
| 9,477,165 | B2 | 10/2016 | Miyaake et al. | |
| 9,488,925 | B2 | 11/2016 | Chiba et al. | |
| 9,494,898 | B2 | 11/2016 | Sasaki et al. | |
| 9,557,670 | B2 | 1/2017 | Shiba et al. | |
| 9,563,141 | B2 | 2/2017 | Sugimoto et al. | |
| 9,606,464 | B2 | 3/2017 | Yamauchi et al. | |
| 9,618,864 | B2 | 4/2017 | Sugiura et al. | |
| 9,678,450 | B2 | 6/2017 | Kumal et al. | |
| 9,785,075 | B2 | 10/2017 | Nakayama et al. | |
| 9,791,784 | B2 | 10/2017 | Watanabe et al. | |
| 9,804,516 | B2 | 10/2017 | Makabe et al. | |
| 9,851,649 | B2 | 12/2017 | Makabe et al. | |
| 9,885,967 | B2 | 2/2018 | Miyaake et al. | |
| 9,921,503 | B2 | 3/2018 | Yamada et al. | |
| 9,964,873 | B2 | 5/2018 | Yamashita et al. | |
| 10,126,678 | B2 | 11/2018 | Hashida et al. | |
| 10,324,390 | B2 | 6/2019 | Takeyama et al. | |
| 10,429,756 | B2 | 10/2019 | Fuwa et al. | |
| 10,520,843 | B2 | 12/2019 | Yamashita et al. | |
| 10,545,421 | B2 | 1/2020 | Mizoguchi et al. | |
| 10,712,681 | B2 | 7/2020 | Masuda et al. | |
| 10,895,816 | B2 | 1/2021 | Masuda et al. | |
| 2003/0027066 | A1 | 2/2003 | Yamashita et al. | |
| 2003/0055159 | A1 | 3/2003 | Yamashita et al. | |
| 2003/0096185 | A1 | 5/2003 | Yamashita et al. | |
| 2003/0219669 | A1 | 11/2003 | Yamashita et al. | |
| 2004/0115551 | A1 | 6/2004 | Sugiyama et al. | |
| 2005/0079433 | A1 | 4/2005 | Watanabe et al. | |
| 2007/0275315 | A1 | 11/2007 | Nagatomo et al. | |
| 2008/0032226 | A1 | 2/2008 | Sugiyama et al. | |
| 2008/0090162 | A1* | 4/2008 | Tsunemi | G03G 9/08722 430/96 |
| 2008/0227002 | A1 | 9/2008 | Moriya et al. | |
| 2008/0318144 | A1 | 12/2008 | Watanabe et al. | |
| 2009/0003885 | A1 | 1/2009 | Sabu et al. | |
| 2009/0074467 | A1 | 3/2009 | Seshita et al. | |
| 2010/0075243 | A1 | 3/2010 | Shimota et al. | |
| 2011/0033203 | A1 | 2/2011 | Watanabe et al. | |
| 2011/0129773 | A1 | 6/2011 | Shu et al. | |
| 2011/0151372 | A1 | 6/2011 | Watanabe et al. | |
| 2011/0217646 | A1* | 9/2011 | Shirai | G03G 9/08755 430/137.14 |
| 2011/0223532 | A1 | 9/2011 | Sugimoto et al. | |
| 2011/0262853 | A1 | 10/2011 | Watanabe et al. | |
| 2011/0294064 | A1 | 12/2011 | Miyaake et al. | |
| 2012/0219896 | A1 | 8/2012 | Asahina et al. | |
| 2013/0011774 | A1* | 1/2013 | Kamiwaki | G03G 9/08797 430/108.1 |
| 2013/0164669 | A1 | 1/2013 | Yamashita et al. | |
| 2014/0080050 | A1 | 3/2014 | Asahina et al. | |
| 2014/0272689 | A1 | 9/2014 | Yamashita et al. | |
| 2014/0272696 | A1 | 9/2014 | Yamashita et al. | |
| 2015/0056549 | A1* | 2/2015 | Ikeda | G03G 9/08711 430/108.22 |

(56) References Cited

U.S. PATENT DOCUMENTS

| | | | | |
|---|---|---|---|---|
| 2015/0132690 | A1 | 5/2015 | Asahina et al. | |
| 2015/0261110 | A1* | 9/2015 | Nakagawa | G03G 9/08755 430/137.1 |
| 2016/0370720 | A1* | 12/2016 | Yamashita | G03G 9/0821 |
| 2020/0103775 | A1 | 4/2020 | Kitagawa et al. | |
| 2020/0285167 | A1 | 9/2020 | Mizoguchi et al. | |
| 2020/0301298 | A1 | 9/2020 | Inoue et al. | |
| 2021/0124281 | A1 | 4/2021 | Sugiyama et al. | |

FOREIGN PATENT DOCUMENTS

| | | | | |
|---|---|---|---|---|
| JP | 2013-156421 | | 8/2013 | |
| JP | 2015072467 | A * | 4/2015 | G03G 15/08 |
| JP | 2015-166825 | | 9/2015 | |
| JP | 5949812 | | 7/2016 | |
| JP | 5949812 | B2 * | 7/2016 | G03G 13/20 |
| JP | 2018-156058 | | 10/2018 | |
| JP | 2019-061207 | | 4/2019 | |
| WO | WO-2016093365 | A1 * | 6/2016 | G03G 9/0804 |

OTHER PUBLICATIONS

JP-2015072467-A Translation (Year: 2023).*
JP-2012042939-A Translation (Year: 2023).*
U.S. Appl. No. 06/752,591, filed Jul. 8, 1985.
U.S. Appl. No. 07/362,488, filed Jun. 7, 1989.
U.S. Appl. No. 07/596,474, filed Oct. 12, 1990.
U.S. Appl. No. 07/948,453, filed Sep. 21, 1992.
U.S. Appl. No. 08/165,101, filed Dec. 10, 1993.
Japanese Office Action dated Mar. 5, 2024, in Japanese Application No. 2020-140795, 2 pages.

* cited by examiner

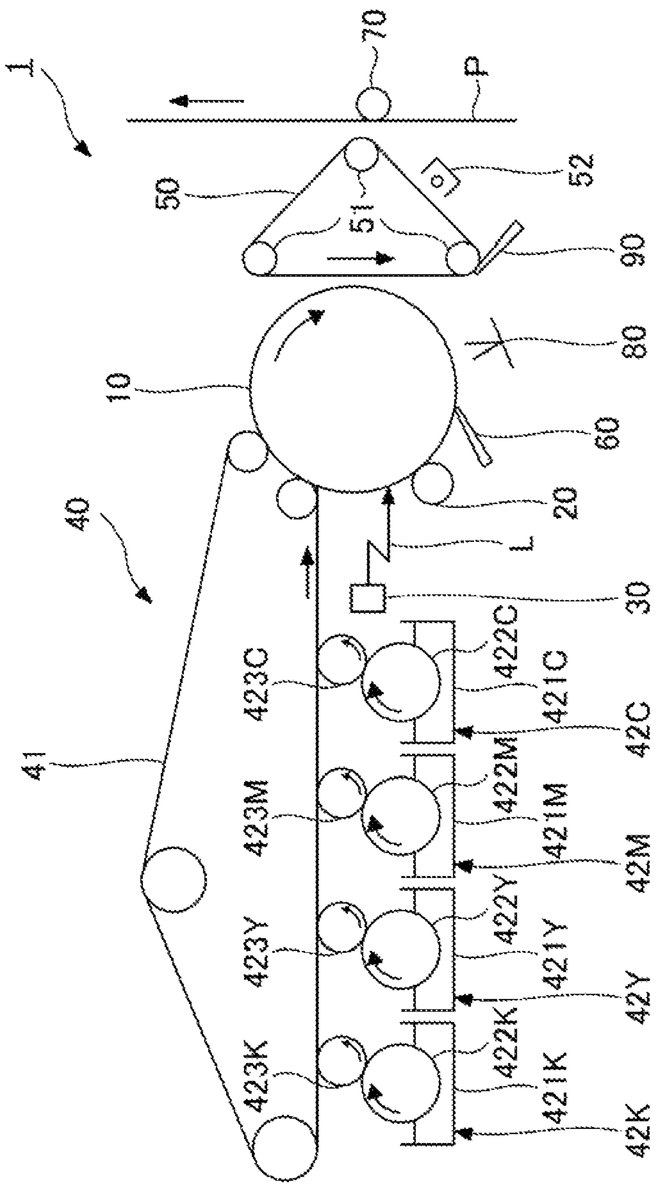
1
70
P
50
51
52
90
10
80
60
20
L
30
40
41
423C
422C
421C
42C
423M
422M
421M
42M
423Y
422Y
421Y
42Y
423K
422K
421K
42K

TONER, METHOD OF MANUFACTURING TONER, TONER STORAGE UNIT, IMAGE FORMING APPARATUS AND METHOD OF FORMING IMAGE

CROSS-REFERENCE TO RELATED APPLICATION

The present application claims priority under 35 U.S.C. § 119 to Japanese Patent Application No. 2020-140795, filed Aug. 24, 2020. The contents of which are incorporated herein by reference in their entirety.

BACKGROUND OF THE INVENTION

1. Field of the Invention

The disclosures herein generally relate to a toner, a method of manufacturing toner, a toner storage unit, an image forming apparatus, and a method of forming an image.

2. Description of the Related Art

Image forming apparatuses that form images using toners, such as multifunction peripherals (MFP) or printers, have been widely used in offices and the like. The toners are required to be provided with low temperature fixing property and heat resistant preservability in order to reduce energy consumption to carry out energy saving and enhance resistance to high temperatures and high humidity during storage or while being transported.

For example, a toner provided with low temperature fixing property and heat resistant preservability including a plurality of toner particles that each include a crystalline resin, a first amorphous resin, and a second amorphous resin has been proposed. A temperature dependence curve of a storage modulus of the toner has a first temperature region in which the storage modulus varies from $1.0\times10^8$ Pa to $2.0\times10^6$ Pa, and a second temperature region in which the storage modulus varies from $1.0\times10^6$ Pa to $1.0\times10^5$ Pa (See, for example, Japanese unexamined patent application publication No. 2019-61207).

SUMMARY OF THE INVENTION

Problem to be Solved by the Invention

However, the toner disclosed in Japanese unexamined patent application publication No. 2019-61207 has a problem in that, because the storage modulus varies in two stages, the steepness in heat characteristic of the storage modulus is not enough for low temperature fixing of the toner and the effect of the low temperature fixing is unlikely to be exhibited. Moreover, the toner disclosed in Japanese unexamined patent application publication No. 2019-61207 has a problem in that the crystalline resin becomes plasticized due to heat at a time of kneading, the first amorphous resin and the second amorphous resin may be incompatible with each other, and sufficient heat resistant preservability cannot be obtained. Furthermore, Japanese unexamined patent application publication No. 2019-61207 does not mention cleanability, i.e. removing a toner stuck to a carrier, a photoreceptor, a blade and the like.

An aspect of the present invention aims at providing a toner that exhibits excellent in the low temperature fixing property, the heat resistant preservability, and the cleanability.

Means for Solving the Problem

According to an aspect of the present disclosure, a toner includes a crystalline polyester resin and an amorphous polyester resin. The ratio of a storage modulus of the toner G' ($T_o$) at a temperature $T_o$ to the storage modulus of the toner G' ($T_o$+3) at a temperature $T_o$+3 is greater than or equal to 10, in a case where the temperature $T_o$ is within a range from 50° C. to 65° C.

Effect of the Invention

According to an aspect of the present disclosure, a toner that exhibits excellent in low temperature fixing property, heat resistant preservability, and cleanability can be provided.

BRIEF DESCRIPTION OF THE DRAWINGS

Other objects and further features of the present invention will be apparent from the following detailed description when read in conjunction with the accompanying drawings, in which:

FIG. 1 is a diagram schematically depicting a configuration of an example of an image forming apparatus according to an embodiment of the present application.

DESCRIPTION OF THE PREFERRED EMBODIMENTS

In the following, embodiments of the present disclosure will be described in detail. The embodiment is not limited to the following descriptions, but may appropriately vary without departing from the scope recited in claims. Moreover, in the specification, a symbol "-" representing a numerical range indicates that values before and after the symbol are included as a lower limit value and an upper limit value, respectively.

<Toner>

A toner according to an embodiment of the present disclosure will be described. The toner according to the embodiment includes a crystalline polyester resin and an amorphous polyester resin. A ratio of the storage modulus of the toner G' ($T_o$) at a temperature $T_o$ to the storage modulus of the toner G' ($T_o$+3) at a temperature $T_o$+3 is greater than or equal to 10. The temperature $T_o$ is within a range from 50° C. to 65° C.

The inventors of the present disclosure extensively had investigated a temperature range which is assumed to be reached in an actual machine of the image forming apparatus or the like and a change rate of viscoelastic characteristic of the toner within the temperature range. The inventers assumed that a temperature $T_o$ fell within a range from 50° C. to 65° C., and measured the storage modulus of the toner G' ($T_o$) at the temperature $T_o$ within the temperature range. A ratio of the storage modulus of the toner G' ($T_o$) at the temperature $T_o$ to the storage modulus of the toner G' ($T_o$+3) at the temperature $T_o$+3 is assumed to be greater than or equal to 10. Then, the toner shows rapid lowering in viscosity within a range of the temperature change of 3° C. or less (sharp melting property) in a range from a temperature of melting start to the temperature at which the low temperature fixing can be performed. Thus, the inventors have found that the toner is provided with an excellent low temperature fixing property and an excellent heat resistant preservability, an increase in an adhesion of the toner is suppressed, and the toner exhibits improved cleanability.

The toner according to the embodiment of the present disclosure is, as described above, a binding resin including a crystalline polyester resin and an amorphous polyester resin. In addition, the toner according to the embodiment may include a binding resin other than the crystalline polyester resin and the amorphous polyester resin, and may include, as necessary, other ingredients such as colorants or release agents.

[Crystalline Polyester Resin]

A crystalline polyester resin is obtained from polyhydric alcohol and polyvalent carboxylic acid or a derivative of the carboxylic acid, such as polyvalent carboxylic acid anhydride or polyvalent carboxylic acid ester. The crystalline polyester resin refers to, as described above, a compound obtained using the polyhydric alcohol and the polyvalent carboxylic acid or the derivative thereof such as the polyvalent carboxylic acid anhydride or the polyvalent carboxylic acid ester. The crystalline polyester resins do not include a resin obtained by modifying the polyester resin, such as a modified polyester resin having a urethane bond and/or a urea bond in a linear chain, or a modified polyester resin obtained by performing crosslinking reaction and/or extension reaction with polymer (prepolymer) that can react with a compound including an active hydrogen group, which will be described later.

(Polyhydric Alcohol)

The polyhydric alcohol is not particularly limited, and can be appropriately selected according to a purpose. For example, the polyhydric alcohols include diol, and trihydric or higher hydric alcohol.

Suitable diols may include, for example, saturated aliphatic diols. The saturated aliphatic diols may be linear saturated aliphatic diols, branched saturated aliphatic diols, and the like. Among them, linear saturated aliphatic diols are preferable, linear saturated aliphatic diols of 2-12 carbon atoms is more preferable. In the case of the branched saturated aliphatic diol, crystallinity may be degraded and a melting point may be lowered. Moreover, it is difficult to synthesize saturate aliphatic diols of 12 or more carbon atoms.

Saturated aliphatic diols may include, for example, ethylene glycol, 1,3-prophane diol, 1,4-buthane diol, 1,5 pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1-14-eicosanedecane diol, and the like. Among them, ethylene glycol, 1,4-buthane diol, 1,6-hexane diol, 1,8-octane diol, 1,9-nonane diol, 1,10-decane diol, and 1,12-dodecane diol are preferable in that the crystallinity of the crystalline polyester resin is high and the sharp melting property is excellent.

Trihydric or higher hydric alcohols may include, for example, glycerin, trimethylolethane, trimethylolpropane, pentaerythritol, and the like. The above-described alcohols may be used singly, or a combination of two or more alcohols may be used.

(Polyvalent Carboxylic Acid)

The polyvalent carboxylic acid is not particularly limited, and can be appropriately selected according to a purpose. For example, suitable polyvalent carboxylic acids may include divalent carboxylic acid and trivalent or higher carboxylic acid.

Suitable divalent carboxylic acids may include, for example, saturated aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid; and an aromatic dicarboxylic acid, such as phthalic acid, isophthalic acid, terephthalic acid, naphthalene-2,6-dicarboxylic acid, or malonic acid, mesaconic acid. Furthermore, anhydrides thereof, or lower (1-3 carbon atoms) alkyl esters thereof may be included.

Suitable trivalent or higher carboxylic acids may include, for example, 1,2,4-benzenetricarboxylic acid, 1,2,5-benzenetricarboxylic acid, 1,2,4-naphthalenetricarboxylic acid, and the like; and anhydrides thereof, lower (1-3 carbon atoms) alkyl esters thereof, or the like. The above-described carboxylic acids may be used singly, or a combination of two or more carboxylic acids may be used.

The crystalline polyester resin is preferably composed of linear saturated aliphatic dicarboxylic acid of 4-12 carbon atoms and linear saturated aliphatic diol of 2-12 carbon atoms. According to the above-described composition, the crystalline polyester resin has high crystallinity and is excellent in the sharp melting property. Thus, the toner exhibits an excellent low temperature fixing property.

Moreover, a method of controlling the crystallinity and a softening point of the crystalline polyester resin includes designing, using, and the like non-linear polyester or the like. The non-linear polyester may be obtained by subjecting condensation polymerization adding trihydric or higher hydric alcohol such as glycerin to an alcohol component, and adding trivalent or higher carboxylic acid such as an anhydrous trimellitic acid to an acid component at the time of synthesis of the polyester.

The molecular structure of the crystalline polyester resin may be determined through nuclear magnetic resonance (NMR) of a liquid or solid sample, X-ray diffraction, GC/MS (gas chromatography mass spectrometry), LC/MS (liquid chromatography mass spectrometry), IR (infrared) spectroscopy, or the like. Alternatively, the molecular structure may be determined based on the infrared absorption spectrum in which an absorption based on an out-of-plane bending vibration (δCH) of an olefin is observed at 965±10 $cm^{-1}$ or at 990±10 $cm^{-1}$, as an example.

The molecular weight of the crystalline polyester resin is estimated taking into account that a resin with a low molecular weight has a sharp molecular weight distribution and is excellent in the low temperature fixing property, but as the amount of the low molecular weight resins increase the heat resistant preservability degrades. The molecular weight of the crystalline polyester resin is estimated from a molecular weight distribution diagram in which the molecular weight distribution of a soluble component of ortho-dichlorobenzene, as measured using gel permeation chromatography (GPC), is plotted with log(M) on the horizontal axis and the mass % on the vertical axis. A peak position in the molecular weight diagram is assumed to be within a range from 3.5 to 4.0, and a half-value width of the peak is assumed to be less than or equal to 1.5. A weight-average molecular weight (Mw) preferably is within a range from 3000 to 30000, and more preferably is within a range from 5000 to 15000. A number-average molecular weight (Mn) preferably is within a range from 1000 to 10000, and more preferably is within a range from 2000 to 10000. A ratio of the weight-average molecular weight (Mw) to the number-average molecular weight (Mn) preferably is within a range from 1 to 10, and more preferably is within a range from 1 to 5.

An acid number of the crystalline polyester resin is preferably 5 mgKOH/g or more to achieve the target low temperature fixing property from a viewpoint of an affinity between a paper and the resin, and more preferably 7 mgKOH/g or more to prepare fine particles using a phase inversion emulsification method. On the other hand, the acid number of the crystalline polyester resin is preferably 45 mgKOH/g or less to enhance hot off-set property.

A hydroxyl number of the crystalline polyester resin preferably is within a range from 0 mgKOH/g to 50 mgKOH/g, and more preferably is within a range from 5 mgKOH/g to 50 mgKOH/g to achieve the target low temperature fixing property and achieve an excellent charging characteristic.

A content of the crystalline polyester resin is preferably 15 mass % or less, more preferably 13 mass % or less, and further preferably 10 mass % or less. When the content of the crystalline polyester resin exceeds 15 mass %, the crystalline polyester resins present on a surface of a toner particle increase, and an adhesion of toner tends to decrease. Moreover, a part of the crystalline polyester resin inside the toner particle becomes plasticized with the amorphous polyester resin, the toner is softened, and the toner particle becomes liable to be deformed. Thus, the contact area between toner particles increases, and the adhesion of the toner may decrease. If the content of the crystalline polyester resin is 15 mass, or less, the toner can be provided with sharp melting property, thereby decreasing the adhesion of the toner and enhancing the cleanability.

An endothermic amount derived from the crystalline polyester resin in the first temperature increase of the toner is preferably 10 J/g or more, more preferably 15 J/g or more, and further preferably 20 J/g or more.

[Amorphous Polyester Resin]

The amorphous polyester resin has sufficient flexibility even if the molecular weight is reduced. The amorphous polyester resin is sharply molten at the time of fixing, and functions as a binding resin that smooths the surface of an image The amorphous polyester resins include both an unmodified polyester resin that does not include a urethane bond and/or a urea bond in a linear chain, and a modified polyester resin that includes a urethane bond and/or a urea bond in the linear chain.

The amorphous polyester resin preferably includes a modified polyester resin having a urethane bond and/or a urea bond in the linear chain. By including the modified polyester resin having the urethane bond and/or the urea bond in the linear chain, the heat resistant preservability by the cross-linking can be secured, and flexibility in the design of the low temperature fixing can be increased.

(Unmodified Polyester Resin that does not Include a Urethane Bond and/or a Urea Bond in a Linear Chain)

An unmodified polyester resin is a polyester resin obtained using polyhydric alcohol; and polyvalent carboxylic acid or derivative thereof such as polyvalent carboxylic acid anhydride or polyvalent carboxylic acid ester, and is not modified by an isocyanate compound or the like.

Suitable polyhydric alcohols may include, for example, diols or the like.

Suitable diols may include, for example, alkylene (2-3 carbon atoms) oxide (average addition molar number: 1-10) adduct of bisphenol A, such as polyoxypropylene (2.2)-2,2-bis (4-hydroxyphenyl) propane, or polyoxyethylene (2.2)-2,2-bis (4-hydroxyphenyl) propane; ethylene glycol, propylene glycol; hydrogenated bisphenol A, alkylene (2-3 carbon atoms) oxide (average addition molar number: 1-10) adduct of the hydrogenated bisphenol A, and the like. The above-described diols may be used singly, or a combination of two or more diols may be used.

Suitable polyvalent carboxylic acids may include, for example, dicarboxylic acid and the like.

Suitable dicarboxylic acids may include, for example, adipic acid, phthalic acid, isophthalic acid, terephthalic acid, fumaric acid, maleic acid; succinic acid substituted with an alkyl group of 1-20 carbon atoms or an alkenyl group of 2-20 carbon atoms, such as dodecenylsuccinic acid or octylsuccinic acid, and the like. In particular, from a point of the heat resistant preservability, the terephthalic acid is preferably included at 50 mol % or more. The above-described dicarboxylic acids may be used singly, or a combination of two or more dicarboxylic acids may be used.

Moreover, suitable unmodified polyester resins may include trivalent or higher carboxylic acids and/or trihydric or higher hydric alcohols at a terminal of the resin chain, to control the acid number and the hydroxyl number.

Trivalent or higher carboxylic acids may include, for example, trimellitic acid, pyromellitic acid, or acid anhydrides thereof, or the like.

Trihydric or higher hydric alcohols may include, for example, glycerin, pentaerythritol, trimethylolpropane, or the like.

A molecular weight of the unmodified polyester resin is not particularly limited, and can be appropriately selected according to a purpose. When the molecular weight is too small, the heat resistant preservability of the toner and durability against processes such as resistance to shear stress in the developing device may be reduced. When the molecular weight is too large, viscoelasticity of the toner at the time of melting becomes high, and the low temperature fixing property may be degraded. Thus, in the GPC, the weight-average molecular weight (Mw) of the unmodified polyester resin preferably is within a range from 3000 to 10000, and more preferably is within a range from 4000 to 7000. The number-average molecular weight (Mn) preferably is within a range from 1000 to 4000, and more preferably is within a range from 1500 to 3000. The ratio of the weight-average molecular weight (Mw) to the number-average molecular weight (Mn) preferably is within a range from 1.0 to 4.0, and more preferably is within a range from 1.0 to 3.5.

Moreover, when the resin includes too many components of resins having molecular weights of 600 or less the heat resistant preservability of the toner and the durability may be degraded. When the components of resins having molecular weights of 600 or less are too few, the low temperature fixing property may be degraded. Thus, the content of the components of resins having molecular weights of 600 or less preferably is within a range from 2 mass % to 10 mass %.

Moreover, the unmodified polyester resin may be refined by using ethanol extraction to remove the component of resins having molecular weights of 600 or less.

An acid number of the unmodified polyester resin is not particularly limited, and can be appropriately selected according to a purpose. The acid number preferably is within a range from 1 mgKOH/g to 50 mgKOH/g, and more preferably is within a range from 5 mgKOH/g to 30 mgKOH/g. When the acid number is 1 mgKOH/g or more, the toner is negatively charged easily, the affinity between a paper and the toner is good at the time of fixing to the paper, and the low temperature fixing property can be improved. Moreover, when the acid number is 50 mgKOH/g or less, reductions in the charge stability, particularly in the charge stability with respect to environmental changes, can be effectively avoided.

A hydroxyl number of the unmodified polyester resin is not particularly limited, and can be appropriately selected according to a purpose. From a viewpoint of achieving the predetermined low temperature fixing property and an excellent charging characteristic, the hydroxyl number preferably is within a range from 0 mgKOH/g to 50 mgKOH/g, and more preferably is within a range from 5 mgKOH/g to 50 mgKOH/g.

The glass transition temperature (also referred to as a glass transition point) Tg of the unmodified polyester resin preferably is within a range from 40° C. to 80° C., and more preferably is within a range from 50° C. to 70° C. When the glass transition temperature Tg is 40° C. or higher, decreases in the heat resistant preservability of the toner, the durability, and filming resistance may be avoided. Moreover, when the glass transition temperature Tg is 80° C. or less, it is possible to obtain sufficient deformation of the toner according to the heating and pressuring at the time of the fixing of the toner, and sufficient low temperature fixing property can be obtained.

(Modified Polyester Resin Having a Urethane Bond and/or a Urea Bond in a Linear Chain)

The modified polyester resin having a urethane bond and/or a urea bond in a linear chain is not particularly limited, and can be appropriately selected according to a purpose. Because the urethane bond or the urea bond exhibits behavior of a pseudo-crosslinking point, rubber-like property of the polyester resin is enhanced, and the heat resistant preservability of the toner can be improved, function of enhancing the adhesiveness to a recording medium such as a paper can be exhibited.

The modified polyester resin having a urethane bond and/or a urea bond in a linear chain is preferably a resin that exhibits rubber-like behavior under an environment of the temperature at which the toner is used. Thus, the modified polyester resin having a urethane bond and/or a urea bond in a linear chain preferably has a glass transition temperature Tg of 20° C. or lower, and exhibits viscoelastic behavior so as to have a rubber-like flat region under an environment of the room temperature or higher.

The modified polyester resin having a urethane bond and/or a urea bond in a linear chain preferably includes, as constituent components, a diol component, a cross-linking component, and a dicarboxylic acid component.

(Diol Component)

The diol component preferably has an odd number of carbon atoms in a part of a main chain, and has an alkyl group in a side chain. The diol preferably has a structure expressed by the following general formula (1), similar to the linear saturated aliphatic diol of 3-10 carbon atoms, $$HO—(CR^1R^2)_n—OH \qquad (1)$$

where each of $R^1$ and $R^2$ independently represents a hydrogen atom or an alkyl group of 1-3 carbon atoms, n represents an odd number within a range from 3 to 9, and among the n recurring units $R^1$ and $R^2$ may be the same or different, respectively.

The diol component is not particularly limited, and can be appropriately selected according to a purpose. Suitable diol components may include, for example, aliphatic diols such as ethylene glycol, 1,2-propylene glycol, 1,3-propylene glycol, 1,4-butane diol, 2-methyl-1,3-propane diol, 1,5-penta diol, 3-methyl-1,5-pentane diol, 1,6-hexane diol, 1,8-octane diol, 1,10-decane diol, or 1,12-dodecane diol; diols having an oxyalkylene group such as diethylene glycol, triethylene glycol, dipropylene glycol, polyethylene glycol, polypropylene glycol, or polytetramethylene glycol; alicyclic diols such as 1,4-cyclohexane dimethanol, or hydrogenated bisphenol A; alicyclic diol to which alkylene oxide such as ethylene oxide, propylene oxide, or butylene oxide is added; bisphenol compound such as bisphenol A, bisphenol F, or bisphenol S; alkylene oxide adduct of bisphenol compound such as a bisphenol product to which alkylene oxide such as ethylene oxide, propylene oxide, or butylene oxide is added; and the like. Among them, aliphatic diol of 4-12 carbon atoms is preferable. The above-described diol components may be used singly, or a combination of two or more diol components may be used.

((Crosslinking Component))

The crosslinking component includes trihydric or higher hydric aliphatic alcohol. The trihydric or higher hydric aliphatic alcohol is not particularly limited, and can be appropriately selected according to a purpose. For example, suitable trihydric or higher hydric aliphatic alcohols may include glycerin, trimethylolethane, trimethylolpropane, pentaerythritol, sorbitol, dipentaerythritol, and the like. Among them, from a point of a gloss and an image density of a fixed image, trihydric or tetrahydric aliphatic alcohol is preferably included. The above-described trihydric or higher hydric aliphatic alcohols may be used singly, or a combination of two or more aliphatic alcohols may be used.

((Dicarboxylic Acid Component))

The dicarboxylic acid component is not particularly limited, and can be appropriately selected according to a purpose. Suitable dicarboxylic acid components may include, for example, aliphatic dicarboxylic acids, aromatic dicarboxylic acids, and the like. Moreover, anhydrides thereof, lower (1-3 carbon atoms) alkyl esters thereof, halogenides thereof may be used.

Suitable aliphatic dicarboxylic acids may include, for example, succinic acids, adipic acids, sebacic acids, dodecanedioic acids, maleic acids, fumaric acids, and the like.

Suitable aromatic dicarboxylic acids may include, for example, phthalic acids, isophthalic acids, terephthalic acids, naphthalenedicarboxylic acids, and the like. Among them, the aromatic dicarboxylic acid of 4-12 carbon atoms is preferable. The above-described dicarboxylic acids may be used singly, or a combination of two or more dicarboxylic acids may be used.

((Modified Polyester Resin))

The modified polyester resin having a urethane bond and/or urea bond in a linear chain preferably includes, as a constituent component, an adhesive base modified polyester resin. The adhesive base modified polyester resin can be appropriately selected according to a purpose. Suitable adhesive base modified polyester resins may include, for example, compounds including an active hydrogen group, resins obtained by the following reaction. For a polymer that can react with the compound including an active hydrogen group, a crosslinking reaction and/or an extension reaction (in the following, may be referred to as a "prepolymer") is performed. The crosslinking reaction and/or the extension reaction may be terminated by a reaction terminator, that blocks further reaction with monoamine such as diethylamine, dibutylamine, butylamine, laurylamine, or ketimine, as necessary.

——Compound Including an Active Hydrogen Group—

The compound including an active hydrogen group can be function as an extending agent or a crosslinking agent when the prepolymer generates the polyester resin by the extension reaction and/or the crosslinking reaction in an aqueous medium (aqueous solvent).

The active hydrogen group is not particularly limited, and can be appropriately selected according to a purpose. For example, suitable active hydrogen groups may include hydroxyl groups (alcoholic hydroxyl groups and phenolic hydroxyl groups), amino groups, carboxyl groups, mercapto groups, and the like. The above-described active hydrogen groups may be used singly, or a combination of two or more active hydrogen groups may be used.

The compound including an active hydrogen group is not particularly limited as long as an active hydrogen group is included, and can be appropriately selected according to a purpose. The compounds including active hydrogen groups are preferably amines, because if the prepolymer includes an isocyanate group, which will be described later, the molecular weight of the prepolymer including an isocyanate group can be increased.

Suitable amines may include, for example, diamines, trivalent or higher valence amines, amino alcohols, amino mercaptans, amino acids, amines that block the above-described amino groups, and the like. The above-described amines may be used singly, or a combination of two or more amines may be used. Among them, a diamine, or a mixture of a diamine and a small amount of the trivalent or higher valence amine is preferable.

Suitable diamines may include, for example, aromatic diamines, alicyclic diamines, aliphatic diamines, and the like. The aromatic diamines include, for example, phenylenediamine, diethyltoluenediamine, 4,4'-diaminodiphenylmethane, and the like. The alicyclic diamines include, for example, 4,4'-diamino-3,3'-dimethyldicyclohexylmethane, diaminocyclohexane, isophoronediamine, and the like. The aliphatic diamines include, for example, ethylenediamine, tetramethylenediamine, hexamethylenediamine, and the like.

The trivalent or higher valence amines include, for example, diethylene triamine, triethylenetetramine, and the like.

The amino alcohols include, for example, ethanolamine, hydroxyethylaniline, and the like.

The amino mercaptans include, for example, amino ethylmercaptan, aminopropylmercaptan, and the like.

The amino acids include, for example, aminopropionic acid, aminocapronic acid, and the like.

The amines that block the amino groups include, for example, ketimine compounds obtained by blocking the amino groups with ketone, such as acetone, methylethylketone, or methylisobutylketone, an oxazoline compound, and the like.

——Polymer that can React with a Compound Including an Active Hydrogen Group—

The polymer that can react with a compound including an active hydrogen group (prepolymer) is not particularly limited, as long as the prepolymer has at least a part that can react to a compound including an active hydrogen group, and can be appropriately selected according to a purpose. The polymers include, for example, polyol resin, polyacrylic resin, polyester resin, epoxy resin, derivatives thereof, and the like. The above-described polymers may be used singly, or a combination of two or more polymers may be used. Among them, the polyester resin including an active hydrogen group is preferable from a point of high fluidity and transparency at the time of melting.

Suitable polyester resins including active hydrogen groups may include, for example, polyester resins that contain a hydroxyl group, and the like.

The parts of the prepolymer that can react to a compound including an active hydrogen group may include, for example, isocyanate groups, epoxy groups, carboxyl groups, functional groups expressed by —COCl, and the like. The above-described parts may be used singly, or a combination of two or more parts may be used. Among them, the isocyanate group is preferable.

That is, the prepolymer is preferably a polyester resin having an isocyanate group that can form a urea bond, because the molecular weight of a polymer component can be easily controlled, and an oilless low temperature fixing property for a dry toner can be secured, in particular an excellent releasing property and an excellent fixing property can be secured even if releasing oil coating mechanism is not present for a heat medium for fixing.

The polyisocyanate is not particularly limited, and can be appropriately selected according to a purpose. For example, suitable polyisocyanates may include diisocyanate, trivalent or higher valent isocyanate, and the like.

Suitable diisocyanates may include, for example, aliphatic diisocyanates, alicyclic diisocyanates, aromatic diisocyanates, aliphatic-aromatic diisocyanates, isocyanurates, diisocyanates that block the above-described diisocyanates by phenol derivative, oxime, caprolactam, or the like.

Suitable aliphatic diisocyanates may include, for example, tetramethylenediisocyanate, hexamethylenediisocyanate, 2,6-diisocyanatomethylcaproate, octamethylenediisocyanate, decamethinediisocyanate, dodecamethylenediisocyanate, tetradecamethylenediisocyanate, trimethylhexanediisocyanate, tetramethylhexanediisocyanate, and the like.

Suitable alicyclic diisocyanates may include, for example, isophoronediisocyanate, cyclohexylmethanediisocyanate, and the like.

The aromatic diisocyanates include, for example, tolylenediisocyanate, diisocyanatediphenylmethane, 1,5-naphthalendiisocyanate, 4,4'-diisocyanatodiphenyl, 4,4'-diisocyanato-3,3'-dimethyldiphenyl, 4,4'-diisocyanato-3-methyldiphenylmethane, 4,4'-diisocyanato-diphenylether, and the like.

Suitable aliphatic-aromatic diisocyanates may include, for example, α,α,α',α'-tetramethylxylylenediisocyanate, and the like.

Suitable isocyanurates may include, for example, tris (isocyanatoalkyl) isocyanurate, tris (isocyanatocycloalkyl) isocyanurate, and the like.

The above-described isocyanates may be used singly, or a combination of two or more isocyanates may be used.

The molecular structure of the amorphous polyester resin may be determined by the NMR using a liquid or solid sample, the X-ray diffraction, the GC/MS, the LC/MS, the IR spectroscopy, or the like. Simply, the molecular structure may be determined based on the infrared absorption spectrum in which an absorption based on an out-of-plane bending vibration (δCH) of olefin is not observed at 965±10 $cm^{-1}$ and at 990±10 $cm^{-1}$, as an example.

[Vinyl Polymer Modified Polyester Resin]

The toner according to the embodiment of the present application preferably includes vinyl polymer modified polyester resin. The vinyl polymer modified polyester resin is a polymer obtained by modifying crystalline polyester resin using either styrene or (meth) acrylic compound, or using both of the styrene and the (meth) acrylic compound.

The crystalline polyester resin has amphiphilicity to both crystalline polyester resin and an amorphous polyester resin present in a matrix form in the toner. Because the toner according to the embodiment of the present application can stabilize crystalline polyester resin particles in the toner using the vinyl polymer modified polyester resin, the crystalline polyester resin particles can be dispersed uniformly inside the toner.

If the method of mixing a dispersion liquid including the crystalline polyester resin (a crystalline polyester resin dispersion liquid) into an oil phase in water and causing the oil phase to form oil droplets in the water is employed, the crystalline polyester resin is thought to have an effect that the crystalline polyester resin remains inside the oil droplets in the water.

The vinyl polymer modified polyester resin can be manufactured by a method including a step of a polycondensation reaction by a raw material monomer of a polyester resin part (a polycondensation step), and a step of an addition polymerization reaction by a raw material monomer of a vinyl-based resin part (an addition polymerization step).

The polycondensation step may be performed before the addition polymerization step, after the addition polymerization step, or simultaneously with the addition polymerization step. Moreover, the polycondensation step and the addition polymerization step are preferably performed in the same reaction vessel.

Moreover, polycondensation resin that was previously polymerized may be used instead of performing the polycondensation reaction.

In the case of performing the polycondensation reaction in parallel with the addition polymerization reaction, the reaction may be performed by dropping a mixture including the raw material monomer of the vinyl resin part into a mixture including the raw material monomer of the polyester resin part.

The (meth) acrylic compound is preferably (meth) acrylic acid alkyl ester. Suitable (meth) acrylic acid alkyl esters may include methyl (meth) acrylate, ethyl (meth) acrylate, (iso) propyl (meth) acrylate, (iso) butyl (meth) acrylate, or the like. The above-described esters may be used singly, or a combination of two or more esters may be used.

In the specification of the present application, the term "(iso)" indicates that the case in which the group is present and the case in which the group is absent are included. When the group is absent, the ester is "normal". Moreover, the "(meth) acrylic acid" means acrylic acid, methacrylic acid, or both the acrylic acid and the methacrylic acid.

The raw material monomer of the vinyl resin part preferably further includes styrene compounds from a point of controlling a glass transition point Tg of the toner to secure the preservability.

Suitable styrene compounds may include styrenes, α-methyl styrenes, styrene derivatives such as vinyltoluene, and the like.

The alcohol component of the crystalline polyester resin preferably includes aliphatic diol of 6-12 carbon atoms.

Suitable aliphatic diols of 6-12 carbon atoms may include, 1,6-hexane diol, 1,7-heptane diol, 1,8-octane diol, 1,9-nonane diol, 1,10-decane diol, 1,11-undecane diol, 1,12-dodecane diol, and the like.

The carboxylic acid component of the crystalline polyester resin preferably includes aliphatic dicarboxylic acid-based compound of 4-14 carbon atoms from a viewpoint of the low temperature fixing property.

Suitable aliphatic dicarboxylic acid-based compounds of 4-14 carbon atoms may include a succinic acid (carbon number is 4), suberic acid (carbon number is 8), azelaic acid (carbon number is 9), sebacic acid (carbon number is 10), dodecanedioic acid (carbon number is 12), tetradecanedioic acid (carbon number is 14), succinic acid having an alkyl group or an alkenyl group on side chain, anhydrates of the above-described acids, alkyl esters of 1-3 carbon atoms of the above-described acids, and the like.

In the embodiment of the present application, the carboxylic acid-based compounds include not only free acids, but also anhydrates that are decomposed during the reactions to generate acids, and alkyl esters of 1-3 carbon atoms. The carbon number of the alkyl group of the alkyl ester part is not included in the carbon number of the aliphatic dicarboxylic acid-based compound.

[Other Binding Resin]

The toner according to the embodiment of the present application may include additional binding resin component other than the above-described crystalline polyester resin and the amorphous polyester resin. The additional binding resin is not particularly limited. Suitable additional binding resins may include known binding resins, such as silicone resin, styrene-acrylic resin, styrene resin, acrylic resin, epoxy resin, diene-based resin, phenol resin, terpene resin, coumarin resin, amide-imide resin, butyral resin, urethane resin, or ethylene-vinyl acetate resin.

<Toner Characteristics>

An evaluation method for the characteristics of the toner according to the embodiment of the present application will be described.

[Storage Modulus of Toner]

The storage modulus G' of the toner according to the embodiment of the present application can be measured using any conventional method. For example, the storage modulus G' can be measured by a dynamic viscoelasticity measuring device (ARES-G2 by TA Instruments, Inc.). Specifically, a measurement sample having a shape of a pellet with a diameter of 8 mm and a thickness of 1 mm-2 mm is prepared, the sample is fixed to a parallel plate with a diameter of 8 mm, and stabilized at the temperature of 40° C. Then, the storage modulus G' is measured while raising the temperature to 200° C. at a rate of 2.0° C. per minute, with a frequency of 1 Hz (6.28 rad/s) and a distortion amount of 0.1% (a distortion amount control mode).

When the temperature To is within a range from 50° C. to 65° C., a ratio of the storage modulus of the toner G' (To) at the temperature To to the storage modulus of the toner G' (To+3) at the temperature To+3, i.e. G' (To)/G' (To+3), is greater than or equal to 10. According to the above-described property, the toner of the embodiment of the present application has a sharp melting property in the temperature range from a temperature of a melting start to the temperature at which the low temperature fixing can be performed, i.e. from 50° C. to 65° C. Moreover, an increase in an adhesion of the toner can be suppressed.

Moreover, the ratio G' (To)/G' (To+3) preferably is within a range from 50 to 500. When the ratio G' (To)/G' (To+3) is greater than or equal to 50, the effect of the low temperature fixing property can be exhibited more. Moreover, when the ratio G' (To)/G' (To+3) is less than or equal to 500, both the effect of the low temperature fixing property and the effect of the lowering of the adhesion can be exhibited.

The storage modulus G' (100) at 100° C. of the toner according to the embodiment of the present application is preferably 3000 Pa or less, more preferably 2700 Pa or less, and further preferably 2500 Pa or less. When the storage modulus G'(100) at 100° C. of the toner according to the embodiment of the present application is less than or equal to 3000 Pa, the toner has sufficient thermal property, and more excellent low temperature fixing property can be exhibited. The storage modulus G'(100) at 100° C. of the toner according to the embodiment of the present application is preferably 2000 Pa or more. When the storage modulus G' (100) at 100° C. of the toner according to the embodiment of the present application is within a range from 2000 Pa to 3000 Pa, both the effect of the low temperature fixing property and the effect of the lowering of the adhesion can be exhibited.

[Method of Calculating and Analyzing a Formulation Amount of a Component Included in the Toner]

The content of the crystalline polyester resin in the toner can be calculated using any conventional method. The respective components, such as the crystalline polyester resin, are separated from the toner using the GPC or the like. The separated components are analyzed using the analysis method described below, and thereby mass ratios of the respective components are obtained. Moreover, the content of the crystalline polyester resin can also be calculated by determining quantitatively the component of the crystalline polyester resin using the gas chromatograph mass spectrometry (GCMS).

For example, the components may be separated using the GPC as follows. In the GPC of tetrahydrofuran (THF) as a moving phase, sampling is performed for an eluted liquid by a fraction collector or the like, and fractions of the liquid corresponding to the desired molecular weights are collected from among the fractions in the entire area of the elution curve. The collected eluted liquid is condensed and dried by an evaporator or the like, and the collected solid is dissolved in deuterated solvent such as deuterochloroform or deutero-tetrahydrofuran. Then, the sample is subjected to proton nuclear magnetic resonance ($^1$H-NMR) analysis, and from integration ratios of the respective elements, constituent monomer ratios of the resin in the eluted components are calculated. Moreover, alternatively, the constituent monomer ratios may be calculated by the following method. The eluted liquid is condensed, and the condensed liquid is subjected to hydrolysis using sodium hydroxide or the like, qualitative analysis is performed for the decomposition products using high performance liquid chromatography (HPLC) or the like.

(Method of Separating Components in the Toner)

An example of the method of separating the components in the analysis of the toner will be described in detail. One gram of the toner is dissolved in 100 mL of THF, the THF is agitated for thirty minutes under the condition of the temperature of 25° C. The solution is filtered by a membrane filter having a mesh size of 0.2 μm, and the THF soluble component in the toner is obtained. Then, the soluble component is dissolved in THF to prepare a sample for GPC. The sample is injected into the GPC used for the above-described measurement of the molecular weight of the resin. Moreover, a fraction collector is arranged at an eluted liquid exhaust port, an eluted liquid is sampled for every predetermined number of counts, and an eluted liquid of each 5% in area rates from an elution start of the elution curve (a rise of the curve). Then, for each elution, a sample of 30 mg is dissolved in deuterochlorofolm of 1 mL, and tetramethylsilane (TMS) of 0.05 volume % as a reference substance is added, to prepare a control sample. The solution of the control sample is filled in a glass tube having a diameter of 5 mm for the NMR. Using a nuclear magnetic resonance apparatus (JNM-AL400, by JEOL Ltd.), 128 integrations are performed under the condition of the temperature within the range from 23° C. to 25° C., and a spectrum is obtained. The monomer compositions and configuration ratios of the crystalline polyester resin, the amorphous polyester resin, and the like included in the toner are obtained from peak integration ratios in the above-described spectrum.

In addition, solubility parameters (SP values) (a unit is $cal^{1/2}/cm^{3/2}$) of the crystalline polyester resin and the amorphous polyester resin may be controlled. When a difference (ΔSP) between the SP values of the crystalline polyester resin and the amorphous polyester resin is too small, the crystalline polyester resin becomes plasticized and compatible with the amorphous polyester resin. Thus, a crystal grows, and the crystalline polyester resin cannot maintain the spherical shape of the toner particle. On the other hand, when the difference (ΔSP) is too great, the crystalline polyester resin makes no progress in the plasticizing, and the effect of the low temperature fixing property is not exhibited. Thus, the difference (ΔSP) preferably is within a range from 1.40 $cal^{1/2}/cm^{3/2}$ to 1.65 $cal^{1/2}/cm^{3/2}$.

[Shape Factor of the Crystalline Polyester Resin SF1]

A shape factor of the crystalline polyester resin SF1 is preferably greater than or equal to 100 and less than or equal to 130, more preferably greater than or equal to 105 and less than or equal to 125, and further preferably greater than or equal to 110 and less than or equal to 120. The shape factor of the crystalline polyester resin is an index indicating a shape (a sphere, an ellipsoid, or the like). For a true sphere, the value of SF1 is 100. As the value of SF1 increases from 100, the shape deviates from the true sphere. When the shape factor SF1 is greater than or equal to 130, the crystalline polyester resin contacts with the amorphous polyester resin, and the plasticization may progress at the time of not being heated. When the shape factor SF1 of the crystalline polyester resin is within the above-described preferable range, the crystalline polyester resin can be present in a shape close to a sphere. Because when the shape is close to a sphere, a surface area of the crystalline polyester resin is small, the plasticization at the time of not being heated can be suppressed and the heat resistant preservability can be maintained, and decrease in the adhesion can be suppressed.

The shape factor SF1 of the crystalline polyester resin can be measured by performing image processing of an image formed with the toner. The image is obtained by a transmission electron microscope (TEM), and the shape factor is obtained using an image processing software for an image analysis apparatus.

The shape factor SF1 is calculated using the formula (2) shown below. The shape factor SF1 is preferably obtained using the above-described image processing software. However, SF1 is not particularly limited to the above-described scanning electron microscope (SEM), the image analysis apparatus, and the image processing software, as long as the same results of analysis.

$$SF1=(L^2/A)\times(\pi/4)\times100 \quad (2)$$

In the above-described formula (2), L represents the maximum length of the crystalline polyester resin, and A represents the projected area of the crystalline polyester resin. The projected area can be calculated using binarization processing by the image processing software.

(Observation and Measurement by the TEM)

The prepared toner is embedded in epoxy resin or the like and cured. Then, an ultrathin slice sample of the toner with a thickness of around 100 nm is prepared using ultramicrotome (ULTRACUT UCT, using a diamond knife, by Leica GmbH).

The sample is exposed in gas using ruthenium tetroxide, osmium tetroxide, or other staining agents, or the like, to stain the sample so as to identify a part of the crystalline polyester resin and the other parts. The exposure time is appropriately adjusted according to contrast at the time of the observation. A lamella structure is often observed in the part of the crystalline polyester resin. Then, the sample is observed using the SEM with an acceleration voltage of 100 kV. According to a composition of the crystalline polyester resin and the amorphous polyester resin, the part of the crystalline polyester resin may be identified without staining. In such a case, the crystalline polyester resin is evaluated without staining. Moreover, the crystalline polyester resin may be evaluated by performing preprocessing of providing contrast by the other methods such as selective etching, and observing by the TEM.

The observed image of a cross section is subjected to binarization processing using commercially available image processing software (e.g. Image-Pro Plus), and the maximum length and the projected area of the toner are obtained. The above-described observation is performed for 50 toners, and the maximum lengths of the respective toners are obtained. An average of the maximum lengths is defined to be the maximum length of the crystalline polyester resin in the embodiment of the present application.

Other characteristics of the toner according to the embodiment of the present application, and methods for measuring the characteristics will be described as follows.

[Measurement of a Particle Size of the Crystalline Polyester Resin in a Crystalline Polyester Resin Dispersion Liquid]

The particle size of the crystalline polyester resin in a crystalline polyester resin dispersion liquid can be measured using, for example, a nanotrack particle size distribution measuring apparatus (UPA-EX150, by Nikkiso Co., Ltd., using a dynamic light scattering method/a laser Doppler method). Specifically, the measurement is performed for the crystalline polyester resin dispersion liquid with the concentration which is adjusted so as to be within a measurement range. A background measurement is performed only with a solvent for the crystalline polyester resin dispersion liquid, before analyzing the sample. By the above-described measurement method, the measured particle sizes of the crystalline polyester resin particles may range from several tens of nanometers to several micrometers. The particle size of the crystalline polyester resin refers to a volume average particle diameter (volume mean diameter).

[Measurement Method of a Melting Point and a Glass Transition Temperature Tg]

A melting point and a glass transition temperature Tg can be measured using, for example, a differential scanning calorimeter (DSC) system (Q-200, by TA Instruments, Inc.). Specifically, the melting point and the glass transition temperature of the sample can be measured according to the following steps.

The sample of about 5.0 mg is put in a sample container made of aluminum, the sample container is placed on a holder unit, and set in an electric furnace. Then, the sample is heated from −80° C. to 150° C. under a nitrogen atmosphere at a rate of 10° C./min (first temperature increase). Then, the sample is cooled from 150° C. to −80° C. at a temperature falling rate of 10° C./min, and heated again to 150° C. at a rate of 10° C./min (second temperature increase). In each of the first and second temperature increases, a DSC curve is measured using a differential scanning calorimeter (DSC) system (Q-200, by TA Instruments, Inc.).

The DSC curve for the first temperature increase is selected, and the glass transition temperature in the first temperature increase for the sample is obtained from the DSC curves using an analysis program in the Q-200 system. Similarly, the DSC curve for the second temperature increase is selected, and the glass transition temperature in the second temperature increase for the sample is obtained from the DSC curve.

Moreover, the DSC curve for the first temperature increase is selected, and a heat absorbing peak top temperature in the first temperature increase for the sample is obtained as the melting point from the DSC curve using the analysis program in the Q-200 system. Similarly, the DSC curve for the second temperature increase is selected, and a heat absorbing peak top temperature in the second temperature increase for the sample is obtained as the melting point from the DSC curve.

In the embodiment of the present application, the melting point and the glass transition temperature Tg of the component for the sample refer to the heat absorbing peak top temperature and the glass transition temperature Tg in the first temperature increase, unless otherwise noted.

[Molecular Weight]

Molecular weights of the crystalline polyester resin, the amorphous polyester resin, the vinyl polymer modified polyester resin, and the like are measured using the GPC, unless otherwise noted with the conditions as follows.

Device: HLC-8220GPC (by Tosoh Corporation);
Column: TSKgel (trademark registered) of SuperHZM-Mx3 (by Tosoh Corporation);
Temperature: 40° C.;
Solvent: tetrahydrofuran (THF);
Flow rate: 0.35 mL/min; and
Sample: sample with the concentration of 0.05-0.6 mass % is injected by 0.01 mL.

From the molecular weight distribution of the toner resin measured with the above-described conditions, the weight-average molecular weight Mw is calculated using a calibration curve prepared based on monodispersed polystyrene standard sample.

For the above-described calibration, ten points of the monodispersed polystyrene standard sample, i.e. 5.8×100, 1.085×10000, 5.95×10000, 3.2×100000, 2.56×1000000, 2.93×1000, 2.85×10000, 1.48×100000, 8.417×100000, 7.5×1000000 are used.

[Other Components]

The toner according to the embodiment of the present application may include a coloring agent, a mold release agent, resin fine particles, an electrification control agent, inorganic fine particles, flowability improving agent, cleanability improving agent, a magnetic material, and the other components such as a metallic soap.

(Coloring Agent)

The coloring agent is not particularly limited, and can be appropriately selected according to a purpose from among conventional dyes and pigments. Suitable coloring agents may include, for example, carbon black, nigrosine dye, iron black, naphthol yellow S, hansa yellow (10G, 5G, G), cadmium yellow, yellow iron oxide, loess, chrome yellow, titan yellow, polyazo yellow oil yellow, hansa yellow (GR, A, RN, R), pigment yellow L, benzidine yellow (G, GR), permanent yellow (NCG), vulcan fast yellow (5G, R), tartrazine lake, quinoline yellow lake, anthracite yellow BGL, isoindolinone yellow, colcothar, red lead, vermilion, cadmium red, cadmium mercury red, antimony vermilion, permanent red 4R, paranitraniline red, fire red, para chloro ortho nitro aniline red, lithol fast scarlet G, brilliant fast scarlet, brilliant carmine BS, permanent red (F2R, F4R, FRL, FRLL, F4RH), fast scarlet VD, vulcan fast rubine B, brilliant scarlet G, lithol rubine GX, permanent red F5R, brilliant carmine 6B, pigment scarlet 3B, bordeaux 5B, toluidine maroon, permanent bordeaux F2K, helio bordeaux BL, bordeaux 10B, bon maroon light, bon maroon medium, eosine lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkaline blue lake, peacock blue lake, victoria blue lake, metal-free phthalocyanine blue, phthalocyanine blue, fast sky blue, indanthrene blue (RS, BC), indigo, ultramarine blue, prussian blue, anthraquinone blue, fast violet B, methyl-violet lake, cobalt violet, manganese violet, dioxane violet, anthraquinone violet, chrome green, zinc green, chrome oxide, viridian, emerald green, pigment green B, naphthol green B, green gold, acid green lake, malachite green lake, phthalocyanine green, anthraquinone green, titanium oxide, zinc white, lithopone, and the like. The above-described coloring agents may be used singly, or a combination of two or more coloring agents may be used.

The content of the coloring agent in the toner is not particularly limited, and can be appropriately selected according to a purpose. The content preferably is within a range from 1 mass % to 15 mass %, and more preferably is within a range from 3 mass % to 10 mass %. When the content of the coloring agent is 1 mass % or more, it is possible to suppress lowering of the coloring power of the toner. When the content of the coloring agent is 15 mass % or less, it is possible to efficiently suppress degradation of the coloring of the toner and electric characteristic of the toner due to insufficiency in dispersion of the pigments in the toner.

The coloring agent may be used as a master batch combined with a resin. The resin is not particularly limited, and can be appropriately selected according to a purpose from among conventional resins. For example, the coloring agents include polyesters, styrene or substituted styrene polymers, styrene-based copolymers, polymethyl methacrylates, polybutylmethacrylates, polyvinyl chlorides, polyvinyl acetates, polyethylenes, polypropylenes, epoxy resins, epoxy polyol resins, polyurethanes, polyamides, polyvinyl butyrals, polyacrylic acid resins, rosins, modified rosins, terpene resins, aliphatic hydrocarbon resins, alicyclic hydrocarbon resins, aromatic based petroleum resins, chlorinated paraffins, paraffin waxes, and the like. The above-described resins may be used singly, or a combination of two or more resins may be used.

Suitable styrene or substituted styrene polymers may include, for example, polyester resins, polypara chlorostyrenes, polyvinyl toluenes, and the like. Suitable styrene based copolymers may include, for example, styrene-para chrolostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-chloro methyl methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic ester copolymers, and the like.

The master batch can be manufactured by mixing or kneading the selected resin and the coloring agent while applying high shearing force. During the manufacturing, an organic solvent is preferably added to them to enhance the interaction between the coloring agent and the resin. Moreover, the so-called flushing method is also preferable in that a wet cake of the coloring agent can be used as it is, thereby rendering a drying process unnecessary. In the flushing process, an aqueous paste including the coloring agent and water is mixed or kneaded with the resin and the organic solvent, the coloring agent is thereby transferred to the resin, and the water and the organic solvent are subsequently removed. In the mixing or kneading process, for example, a high shear and dispersion apparatus, such as a three-roll mill, is preferably used. It is known that the coloring agents degrade the charging performance of the toner when the coloring agents are present on the surface of the toner. Thus, as the master batch is adopted to the resin, the charging performance of the toner in terms of an environmental stability, charge retaining capacity, and a charge amount can be improved.

(Release Agent)

The release agent is not particularly limited, and can be appropriately selected according to a purpose. A low melting point release agent having a melting point being within a range from 50° C. to 120° C. is preferable. The low melting point release agent is dispersed with the resin, and thereby the release agent exhibits a high releasing effect between the fixing roller and an interface of the toner. Thus, hot offset property is excellent even if a release agent such as lubricant is not applied (oilless) on a surface of the fixing roller.

The release agents preferably include, for example, waxes or the like. The waxes include, for example, natural waxes including botanical waxes such as carnauba wax, cotton wax, japan wax, and rice wax; animal waxes such as beeswax, and lanolin; mineral-based waxes such as ozocerite, and selsyn; and petroleum waxes such as paraffin, microcrystalline, and petrolatum; and the like. Moreover, in addition to the above-described natural waxes, the release agents may include synthetic hydrocarbon waxes such as fischer-tropsch waxes, and a polyethylene waxes; synthetic waxes such as esters, ketones, and ethers; and the like. Furthermore, aliphatic acid amides such as 12-hydroxystearic acid amide, amide stearate, phthalimide anhydride, or chlorinated hydrocarbons; homopolymers or copolymers of polyacrylate such as poly-n-stearyl methacrylate, or poly-n-lauryl methacrylate, which is a crystalline high polymer resin with a low molecular weight (e.g. a copolymer of n-stearyl acrylate-ethyl methacrylate); a crystalline polymer having a long alkyl group in the side chain; and the like may be used. The above-described polymers may be used singly, or a combination of two or more polymers may be used.

The melting point of the release agent is not particularly limited, and can be appropriately selected according to ta purpose. The melting point preferably is within a range from 50° C. to 120° C., and more preferably is within a range from 60° C. to 90° C. When the melting point is 50° C. or higher, it is possible to suppress bad influence brought from the wax to the heat resistant preservability. When the melting point is 120° C. or lower, it is possible to effectively suppress an occurrence of a cold offset at the time of fixing at low temperature. A melt viscosity of the release agent, as a measured value at a temperature higher than the melting point of the release agent by 20° C., preferably is within a range from 5 cps to 1000 cps, and more preferably is within a range from 10 cps to 100 cps. When the melt viscosity is 5 cps or more, it is possible to retain acceptable releasability. When the melt viscosity is 1000 cps or less, effects of hot offset resistance and the low temperature fixing property can be exhibited sufficiently. The content of the release agent in the toner is not particularly limited, and can be appropriately selected according to a purpose. The content preferably is within a range from 0 mass % to 40 mass %, and more preferably is within a range from 3 mass % to 30 mass %. When the content is 40 mass % or less, it is possible to suppress deterioration of fluidity of the toner.

(Resin Fine Particles)

The resin of the resin fine particles is not particularly limited, as long as an aqueous dispersion can be formed in a water-based medium, and can be appropriately selected according to a purpose from among the conventional resins. The resin of the resin fine particles may be a thermoplastic resin or a thermosetting resin. The resins include, for example, vinyl resin, polyurethane resin, epoxy resin, polyester resin, polyamide resin, polyimide resin, silicon resin, phenol resin, melamine resin, urea resin, aniline resin, ionomer resin, polycarbonate resin, and the like. The above-described resins may be used singly, or combination of two or more resins may be used. Among them, the resin of the resin fine particles is preferably formed of at least one resins selected from the vinyl resin, the polyurethane resin, the epoxy resin and the polyester resin, from the point that an aqueous dispersion of small resin fine particles having spherical shapes can be easily obtained.

Moreover, the vinyl resin is a polymer obtained by homopolymerizing or copolymerizing vinyl monomers. Suitable vinyl resins may include, for example, styrene-(meth)acrylic ester resins, styrene-butadiene copolymers, (meth) acrylic acid-ester acrylate polymers, styrene-acrylonitrile copolymers, styrene-maleic anhydrides, styrene-(meth)acrylic acids, and the like.

(Charge Control Agent)

A charge control agent is not particularly limited, and can be appropriately selected according to a purpose, from conventional agents. The charge control agents include, for example, nigrosine dye, triphenylmethane dye, chromium-including metal complex dye, chelate molybdate dye, rhodamine-based dye, alkoxyamine, quaternary ammonium salt (including fluorine-modified quaternary ammonium salt), alkylamide, simple substance phosphorus or a compound thereof, a simple substance tungsten or a compound thereof, a fluorine-based activator, a metallic salt of salicylic acid, a metallic salt of a salicylic acid derivative, and the like. The above-described agents may be used singly, or a combination of two or more agents may be used.

Commercially available charge control agents may be used. Suitable examples may include, for example, resins or compounds having an electron donating functional group, azo dyes, metal complexes of organic acid, and the like. Specific examples of commercially available products include BONTRON 03, which is nigrosine dye, BONTRON P-51, which is quaternary ammonium salt, BONTRON S-34, which is metal including azo dye, E-82, which is oxynaphtoic acid-based metal complex, E-84, which is salicylic acid metal complex, and E-89, which is phenolic condensate (by Orient Chemical Industries Co., Ltd.); TN-105, which is salicylic acid metal complex, and TP-302 and TP-415, which are quaternary ammonium salt molybdenum complexes (by Hodogaya Chemical Co., Ltd.); copy charge PSY VP2038, which is quaternary ammonium salt, copy blue PR, which is triphenylmethane derivative, copy charge NEG VP2036, which is quaternary ammonium salt, and copy charge NX VP434 (by Hoechst AG); LRA-901, and LR-147, which is boron complex, (by Japan Carlit Co., Ltd.); copper phthalocyanine, perylene, quinacridone, azo-based dyes, and polymer compounds having a functional group, such as a sulfonate group, a carboxyl group, a quaternary ammonium salt; and the like.

The charge control agent can be included as necessary in the resin phase in the toner particle using difference in affinity for the resins in the toner particle. By causing the charge control agent to be selectively included in the resin phase in the toner particle that is present in an inner layer, occurrent of toner spent of the charge control agent to the other units such as a photoconductor, or a carrier, can be suppressed. In a method of manufacturing a toner according to the embodiment of the present application, the charge control agent may be arranged relatively freely. In addition, the charge control agent can be arranged freely according to the image formation process.

(Inorganic Fine Particles)

Inorganic fine particles are used as external additives to provide fluidity, developability, and electrostatic chargeability to the toner particle. The inorganic fine particles are not particularly limited, and can be appropriately selected according to a purpose from among conventional materials. Suitable inorganic fine particles may include, for example, silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, read lead paint, antimony trioxide, magnesium oxide, zirconium oxide, barium sulfate, barium carbonate, calcium carbonate, silicon carbide, silicon nitride, and the like. The above-described materials may be used singly, or a combination of two or more materials may be used.

As the inorganic fine particles for assisting the fluidity, the developability and the electrostatic chargeability of the toner particles, inorganic fine particles with small particle diameters are preferably used in addition to the inorganic fine particles with large particle diameters, i.e. having a primary average particle diameter that is within a range from 80 nm to 500 nm. In particular, hydrophobic silicas and hydrophobic titanium oxides are preferably used as the inorganic fine particles. The primary average particle diameter of the inorganic fine particles preferably is within a range from 5 nm to 50 nm, and more preferably is within a range from 10 nm to 30 nm. Moreover, the specific surface area of the inorganic fine particles measured using the BET method preferably is within a range from 20 $m^2/g$ to 500 $m^2/g$. The use ratio of the inorganic fine particles preferable is within a range from 0.01 mass % to 5 mass % of the toner, and more preferably is within a range from 0.01 mass % to 2.0 mass % of the toner.

(Fluidity Improver)

The fluidity improver is an agent that performs a surface treatment to improve hydrophobicity so as to suppress the degradation of fluidity and chargeability even under an environment of high humidity. The fluidity improvers include, for example, silane coupling agent, silylating agent, silane coupling agent having fluorinated alkyl group, an organic titanate coupling agent, an aluminum based coupling agent, silicone oil, modified silicone oil, and the like. Silica and titanium oxide are preferably subjected to the surface treatment using the above-described fluidity improver, and used as hydrophobic silica and hydrophobic titanium oxide, respectively.

(Cleanability Improver)

A cleanability improver is an agent that is added to the toner to remove any developer that remains on the photoconductor and on a primary transfer medium after transferring a toner image. The cleanability improvers include, for example, zinc stearate, calcium stearate, metallic salt of fatty acid such as stearic acid, polymer fine particles manufactured by soap-free emulsion polymerization, such as polymethyl methacrylate fine particles, and polystyrene fine particles, and the like. The polymer fine particles preferably have relatively narrow particle size distribution. The volume average particle diameter, preferably is within a range from 0.01 μm to 1 μm.

(Magnetic Material)

The magnetic material is not particularly limited, and can be appropriately selected according to a purpose from among the conventional materials. For the magnetic material, for example, iron power, magnetite, ferrite, or the like may be used. Among them, white material is preferable from the point of color tone.

As described above, the toner according to the embodiment of the present application includes the crystalline polyester resin and the amorphous polyester resin, and the ratio of the storage modulus of the toner G' ($T_o$) at the temperature $T_o$ to the storage modulus of the toner G' ($T_o$+3) at the temperature $T_o$+3 (G' ($T_o$)/G' ($T_o$+3)) is greater than or equal to 10, where the temperature $T_o$ is within a range from 50° C. to 65° C. Thus, because the toner according to the embodiment of the present application exhibits sharp melting property within a range from a temperature of melting start to the temperature at which the low temperature fixing can be performed, the toner is provided with an excellent low temperature fixing property and excellent heat resistant preservability, an increase in adhesion of the toner is suppressed, and the toner is provided with excellent cleanability.

In the toner according to the embodiment of the present application, the content of the crystalline polyester resin can be made 15 mass % or less. According to the above-described content, the toner has the sharp melting property. Then, it is possible to suppress the lowering of the adhesion of the toner while maintaining the low temperature fixing property. Furthermore, by enhancing the cleanability, the image quality can be improved.

In a cross-sectional view of the toner particle according to the embodiment of the present application, the shape factor SF1 of the crystalline polyester resin can be set to be greater than or equal to 100 and less than 130. According to the above-described shape factor, the crystalline polyester resin can be present in a shape close to a sphere, and a surface area of the crystalline polyester resin can be minimized. Thus, plasticization of the toner according to the embodiment of the present application at the time of not being heated can be suppressed, and the heat resistant preservability can be maintained, and decrease in adhesion of the toner can be suppressed.

The toner according to the embodiment of the present application has excellent heat characteristic when the storage modulus G' (100) of the toner at the temperature of 100° C. is made to be 3000 Pa or less. Then, the low temperature fixing property can be exhibited more.

When the endothermic amount derived from the crystalline polyester resin in the first temperature increase of the toner according to the embodiment of the present application is made to be 10 J/g or more, the content of the crystalline polyester resin present in the crystal state in the toner can be increased. Then, the crystalline polyester resin can be made difficult to be plasticized at the time of not being heated, and difficult to be compatibilized with the amorphous polyester resin.

The toner according to the embodiment of the present application can include vinyl polymer modified polyester resin. With the vinyl polymer modified polyester resin, respective crystalline polyester resin particles can be stabilized in the toner. Thus, the crystalline polyester resin particles can be arranged uniformly dispersedly in the toner, and the low temperature fixing property and the heat resistant preservability can be further enhanced.

<Method of Manufacturing the Toner>

A method of manufacturing the toner according to the embodiment of the present application includes a step of preparing a water-in-oil type (W/O type) emulsion, in which the crystalline polyester resin is included in a state of being dispersed in the oil phase by mixing aqueous dispersion including crystalline polyester resin (a crystalline polyester resin aqueous dispersion) into an oil phase including an amorphous polyester resin; and a step of preparing an oil-in-water type (O/W type) emulsion in which the crystalline polyester resin is included in a state of being dispersed in an aqueous medium, by mixing the water-in-oil type (W/O type) emulsion into the aqueous medium. Thus, toner base particles are manufactured.

That is, the method of manufacturing the toner according to the embodiment of the present application includes: a step of generating a solution obtained by dissolving crystalline polyester resin in an organic solvent (a generation step of solution); a step of preparing crystalline polyester resin dispersion liquid in which the crystalline polyester resin particles are included in the aqueous medium (a preparing step of crystalline polyester resin dispersion liquid) by mixing the solution into an aqueous medium to generate crystalline polyester resin particles in the aqueous medium, and removing the organic solvent; a step of mixing the crystalline polyester resin dispersion liquid into an oil phase to dissolve the crystalline polyester resin dispersion liquid in the oil phase using a dissolution suspension method, and mixing the oil phase into an aqueous medium to disperse or emulsify the crystalline polyester resin in the aqueous medium, and thereby manufacturing toner base particles (a dissolution suspension step); and a step of removing the organic solvent (an organic solvent removing step).

In the following, each of the above-described steps will be described in detail.

When an organic solvent, neutralizing agent, surfactant, or the like is added to the crystalline polyester resin, solution in which the crystalline polyester resin is dissolved in the organic solvent or the like, is obtained (a step of generating solution).

The organic solvent is not particularly limited, and can be appropriately selected according to a purpose. Suitable organic solvents may include, for example, methanol, ethanol, propanol, isopropyl alcohol (IPA), butanol, ethyl acetate, methyl ethyl ketone (MEK), or combinations thereof. Among them, an organic solvent having a boiling point lower than 150° C. is preferable from a point that the solvent is easy to be removed.

For the neutralizing agent, generally utilized acids or alkalis such as nitric acid, hydrochloric acid, sodium hydroxide, or ammonia can be used.

For the surfactant, one or more kinds of surfactants may be used. The surfactant may be selected from an ionic surfactant and nonionic surfactant. In the embodiment of the present application, the "ionic surfactants" are considered to include anionic surfactants and cationic surfactants.

Next, the solution and an aqueous medium are mixed, and crystalline polyester resin particles are generated in the aqueous medium. Then, the organic solvent is removed, to prepare crystalline polyester resin dispersion liquid in which the crystalline polyester resin particles are included in the aqueous medium (a preparing step of crystalline polyester resin dispersion liquid).

The crystalline polyester resin dispersion liquid is preferably prepared using a phase inversion emulsification method. In the phase inversion emulsification method, the aqueous medium is dropped into the solution under stirring to obtain emulsified particles, the organic solvent is removed from the resin dispersion liquid that includes the solution and the aqueous medium, to obtain an emulsion in which the crystalline polyester resin is dispersed or emulsified. Moreover, the resin dispersion liquid may be heated as necessary.

In addition, the methods of dispersing or emulsifying the crystalline polyester resin include, for example, a method of mechanically crushing, injection granulation, phase inversion emulsification, and the like. When the resin is mechanically crushed, it is difficult to obtain fine particles having narrow particle size distribution. When phase inversion emulsification is used, the particle size can be easily controlled, and crystalline polyester resin particles having narrow particle size distribution can be obtained. Thus, as the method of dispersing or emulsifying the crystalline polyester resin in the aqueous medium, the inversion emulsification is preferable.

When the aqueous medium is mixed into the solution under stirring, the crystalline polyester resin particles are generated as emulsified particles in the aqueous medium.

The method of removing the organic solvent included in the resin dispersion liquid including the solution and the aqueous medium is not particularly limited, and can be appropriately selected according to purpose. Suitable methods may include, for example, gradually increasing the temperature of the entire reaction system to evaporate the organic solvent in oil droplets, spraying the dispersion into a dry atmosphere to remove the organic solvent included in the oil droplets, and the like.

The amount of the crystalline polyester resin particles added to the aqueous medium is not particularly limited, and can be appropriately determined according to a purpose. The amount preferably is within a range from 0.5 pts mass to 10 pts mass, to 100 pts mass of the aqueous medium.

The aqueous medium is not particularly limited, and can be appropriately selected according to a purpose. Suitable aqueous media may include, for example, water, solvents miscible with water, mixtures thereof, and the like. The above-described media may be used singly, or a combination of two or more media may be used. Among them, water is preferably used.

The solvent miscible with water can be appropriately selected according to the purpose. Suitable solvents may include, for example, alcohols, dimethylformamides, tetrahydrofurans, cellosolves, lower ketones, and the like.

Suitable alcohols may include, for example, methanols, isopropanols, ethylene glycols, and the like.

Suitable lower ketones may include, for example, acetones, methylethylketones, and the like.

Next, using the dissolution suspension method, the crystalline polyester resin dispersion liquid is mixed into an oil phase so that the crystalline polyester resin dispersion liquid is dissolved in the oil phase, and the oil phase is mixed into an aqueous medium so that the crystalline polyester resin is dispersed or emulsified in the aqueous medium. Thus, the toner base particles are manufactured (a dissolution suspension step).

Methods of introducing the crystalline polyester resin particles into toners prepared using the phase inversion emulsification method include, for example, crushing, emulsion aggregation, dissolution suspension, and the like. Among them, each of crushing and emulsion aggregation includes a heating step. Due to the heating step it is difficult to maintain the spherical shape of the toner, and a part of the crystalline polyester resin may be plasticized with the amorphous polyester resin by the heat. In contrast, in the dissolution suspension method, the crystalline polyester resin or the like is dissolved in an organic solvent, and dispersed or emulsified in an aqueous medium. With the dissolution suspension method, the particle diameter can be easily controlled, and the crystalline polyester resin particles having narrow particle size distribution. Thus, the dissolution suspension method is preferably used.

Moreover, as described above, it is important to control the SP values of the crystalline polyester resin and the amorphous polyester resin included in the oil phase. When the difference (ASP) between the SP values of the crystalline polyester resin and the amorphous polyester resin is too small, the crystalline polyester resin becomes plasticized and compatible with the amorphous polyester resin. Thus, the crystalline polyester resin grows, and the crystalline polyester resin cannot maintain the spherical shape of the toner particle. On the other hand, when the difference (ASP) is too great, the crystalline polyester resin makes no progress in the plasticizing, and the effect of the low temperature fixing property is not exhibited. In the embodiment of the present application, using the dissolution suspension method, immediately after adding the oil phase to the crystalline polyester resin, the aqueous medium is added to perform the emulsification or the dispersion, and thereby it is possible to suppress the plasticization of the crystalline polyester resin and the amorphous polyester resin.

The dissolution suspension method includes

- a step of mixing the crystalline polyester resin dispersion liquid and the oil phase in which the toner material including the amorphous polyester resin is dissolved or dispersed, to generate water-in-oil type (W/O type) emulsion in which the crystalline polyester resin particles are included in the state of being dispersed in the oil phase (a mixing step);
- a step of mixing the water-to-oil type (W/O type) emulsion and an aqueous medium and performing the emulsification or the dispersion, to generate an oil-in-water type (O/W type) emulsion in which the crystalline polyester resin particles are included in the state of being dispersed in the aqueous medium, and thereby manufacturing the toner base particle (an emulsification or dispersion step).

By mixing the crystalline polyester resin dispersion liquid and the oil phase in which the toner material including the amorphous polyester resin is dissolved or dispersed, the water-in-oil type (W/O type) emulsion, in which the crystalline polyester resin particles are included in the state of being dispersed in the oil phase, is generated (the mixing step).

The oil phase including the toner material can be prepared by dissolving or dispersing the toner material including the amorphous polyester resin in an organic solvent. The toner material preferably includes the modified polyester resin having a urethane bond and/or a urea bond in a linear chain, the crystalline polyester resin, an active hydrogen group-including compound, and prepolymer. The toner material may include release agent, colorant, or the like.

The organic solvent can be appropriately selected according to a purpose from conventional solvents. Among them, an organic solvent having a boiling point lower than 150° C. is preferably from a point that the solvent is easy to be removed.

The organic solvents having the boiling point lower than 150° C. include, for example, toluene, xylene, benzene, carbon tetrachloride, methylene chloride, 1,2-dichloroethane, 1,1,2-trichloroethane, trichloroethylene, chloroform, monochloro benzene, dichloro ethylidene, methyl acetate, ethyl acetate, methylethylketone, methyl isobutyl ketone, and the like. The above-described solvents may be used singly, or a combination of two or more solvents may be used. Among them, ethyl acetate, toluene, xylene, benzene, methylene chloride, 1,2-dichloro ethane, chloroform, and carbon tetrachloride are preferable, and ethyl acetate is more preferable.

Next, by mixing the water-to-oil type (W/O type) emulsion and an aqueous medium and performing the emulsification or the dispersion, an oil-in-water type (O/W type) emulsion in which the crystalline polyester resin particles are included in the state of being dispersed in the aqueous medium is generated (the emulsification or dispersion step).

The amount of aqueous medium used in emulsifying or dispersing the toner material can be appropriately selected according to a purpose. The amount used preferably is within a range from 50 pts mass to 2000 pts mass, and more preferably is within a range from 100 pts mass to 1000 pts mass, to 100 pts mass of the toner material. When the amount used of the aqueous medium is 50 pts mass or more, it is possible to suppress the degradation of the dispersion state of the toner material, and the toner base particles having the predetermined particle diameter can be obtained. When the amount used of the aqueous medium is 2000 pts mass or less, production cost can be reduced.

Moreover, the oil phase preferably includes an active hydrogen group-including compound and prepolymer. When the oil phase includes the active hydrogen group-including compound and the prepolymer, by performing an extension reaction and/or a crosslinking reaction for the active hydrogen group-including compound and the prepolymer included in the oil phase and/or the aqueous medium, the modified polyester resin (an adhesive base material) can be generated, and thereby the toner base particles can be formed.

Timing of generating the adhesive base material is not particularly limited, and can appropriately selected.

The adhesive base material may be generated by, for example, emulsifying or dispersing the oil phase including a polymer having reactivity to an active hydrogen group of polyester resin or the like having an isocyanate group, in the aqueous medium, with the active hydrogen group including compound such as amines, and by performing the extension reaction and/or the crosslinking reaction for both the oil phase and the active hydrogen group-including compound.

Moreover, the adhesive base material may be generated by emulsifying or dispersing the oil phase including a polymer having reactivity to an active hydrogen group in an aqueous medium to which the active hydrogen group-including compound was added in advance, and by performing the extension reaction and/or the crosslinking reaction for both the oil phase and the active hydrogen group-including compound.

Furthermore, the adhesive base material may be generated after emulsifying or dispersing the oil phase including a polymer having reactivity to an active hydrogen group in an aqueous medium, adding an active hydrogen group-including compound, and performing the extension reaction and/or the crosslinking reaction for both the oil phase and the active hydrogen group-including compound from a particle interface. In the case of performing the extension reaction and/or the crosslinking reaction for both the oil phase and the compound from the particle interface, modified polyester resin is formed preferentially on a surface of the generated toner, and concentration gradient of the modified polyester resin can be set in the toner.

A reaction condition (a reaction time, a reaction temperature) for generating the adhesive base material can be appropriately selected according to a combination of the active hydrogen group-including compound and the prepolymer.

The reaction time preferably is within a range from 10 minutes to 40 hours, and more preferably is within a range from 2 hours to 24 hours.

The reaction temperature preferably is within a range from 0° C. to 150° C., and more preferably is within a range from 40° C. to 98° C.

The method of forming the dispersion including the prepolymer steadily in the aqueous medium can be appropriately selected according to a purpose. Suitable methods may include, for example, adding the oil phase prepared by dissolving or dispersing the toner material in solvent to the aqueous medium and dispersing the oil phase by shearing, or the like.

A disperser for performing the dispersion can be appropriately selected according to a purpose. Suitable dispersers may include, for example, low-speed shearing type dispersers, high-speed shearing type dispersers, friction type dispersers, high-pressure jet type dispersers, ultrasonic wave dispersers, and the like. Among them, the high-speed shearing type disperser is preferable from a point that the particle diameters of dispersions (oil droplets) can be controlled so as to be within a range from 2 μm to 20 μm.

When the high-speed shearing type disperser is used, conditions such as revolution speed, dispersion time, or a dispersion temperature can be appropriately selected according to a purpose.

The revolution speed of the disperser preferably is within a range from 1000 rpm to 30000 rpm, and more preferably is within a range from 5000 rpm to 20000 rpm.

The dispersion time preferably is within a range from 0.1 minutes to 5 minutes in match mode.

The dispersion temperature preferably is within a range from 0° C. to 150° C. under pressure, and more preferably is within a range from 40° C. to 98° C. In general, as the dispersion temperature becomes higher, the dispersion occurs more easily.

When the oil phase including the toner material is emulsified or dispersed, dispersant is preferably used so as to stabilize the dispersions such as the oil droplets, form them into a desired shape, and narrow the particle size distribution.

The dispersant can be appropriately selected according to a purpose. Suitable dispersants may include, for example, surfactant, poorly water-soluble inorganic compound dispersant, polymer-based protective colloid, and the like. The above-described dispersants may be used singly, or a combination of two or more dispersants may be used. Of the above dispersants, surfactants are preferable.

The surfactant can be appropriately selected according to a purpose. Suitable surfactants may include, for example, anionic surfactants, cationic surfactants, nonionic surfactants, amphoteric surfactants, and the like.

Suitable anionic surfactants may include, for example, alkylbenzene sulfonates, α-olefin sulfonates, phosphoric esters, and the like. Of the above dispersants, compounds that include a fluoroalkyl group are preferably used.

Next, an organic solvent is removed from the oil-in-water type (O/W type) emulsion (an organic solvent removing step).

By removing the organic solvent from the oil-in-water type (O/W type) emulsion, toner base particles are collected.

The method of removing the organic solvent from the oil-in-water type (an O/W) type emulsion can be appropriately selected according to a purpose. The methods include, for example, gradually increasing the temperature of the entire reaction system to evaporate the organic solvent in oil droplets, spraying the dispersion into a dry atmosphere to remove the organic solvent included in the oil droplets, and the like.

By performing a washing process, a drying process and the like, it is possible to, for example, further classify the collected toner base particles.

The classification process may be performed by removing a portion of the fine particles using a cyclone separator, a decanter, a centrifugal separator, or the like. Alternatively, the classification process may be performed after the drying process.

The resulting toner base particles may be mixed with particles of an external additive, an electrification control agent, or the like. At the time of mixing, by applying mechanical impact to a mixture, it is possible to suppress desorption of particles of the external additive or the like from surfaces of the toner base particles.

The method of applying the mechanical impact the mixture can be appropriately selected according to a purpose. Suitable methods may include, for example, applying an impact to the mixture using blades rotating at a high speed, throwing the mixture into a high-speed airflow to accelerate the mixture, and causing the particles to collide with each other or causing the particles to collide with an impact plate, and the like.

A device to be used for applying the mechanical impact to the mixture can be appropriately selected according to a purpose. For the device, angmill (by Hosokawa micron corporation), a device obtained by modifying I-type mill (by Nippon Pneumatic Mfg. Co., Ltd.) to reduce a pulverizing air pressure, a hybridization system (by Nara machinery Co., Ltd.), Kryptron (trademark registered) (by Kawasaki Heavy Industries, Ltd.), automatic mortar, or the like, may be used.

The method of manufacturing the toner according to the embodiment of the present application include, as described above, a step of mixing crystalline polyester resin dispersion liquid into an oil phase, to prepare a water-in-oil type (W/O type) emulsion in which the crystalline polyester resin particles are dispersed in the oil phase; and a step of mixing the water-in-oil type (W/O type) emulsion into an aqueous medium, to prepare an oil-in-water type (O/W type) emulsion in which the crystalline polyester resin particles are dispersed in the aqueous medium. Thus, the crystalline polyester resin can be introduced and dispersed inside the toner. Moreover, because the crystalline polyester resin dispersion liquid is not directly mixed with the aqueous medium but mixed via the oil phase with the aqueous medium, it is possible to reduce the adhesion of the crystalline polyester resin to the surface of the toner. Thus, the toner according to the embodiment of the present application can be obtained.

Moreover, according to the method of manufacturing the toner of the embodiment of the present application, in the step of preparing the crystalline polyester resin dispersion liquid, by preparing the crystalline polyester resin dispersion liquid by a phase inversion emulsification process, it is possible to generate the crystalline polyester resin particles having spherical shapes with an excellent particle size distribution. Thus, the crystalline polyester resin particles having spherical shapes with the excellent particle size distribution can be introduced into the toner. Furthermore, in the mixing step and the emulsification or dispersion step, the aggregation of the crystalline polyester resin may be minimized, and excessive heat is not applied to the crystalline polyester resin, thereby it is possible to suppress the plasticization of the crystalline polyester resin. Thus, it is possible to maintain the heat resistant preservability of the toner and suppress the decrease in the adhesion.

Moreover, according to the method of manufacturing the toner of the embodiment of the present application, in the mixing step, the vinyl polymer modified polyester resin is preferably mixed into the oil phase including the crystalline polyester resin and the amorphous polyester resin, as dispersion assistant. According to the vinyl polymer modified polyester resin, the crystalline polyester resin becomes easy to be taken into the inside of the toner, and the toner can include the crystalline polyester resin in a state of being dispersed inside the toner. Thus, because it is possible to keep the crystalline polyester resin particles within the oil phase in the aqueous medium, the crystalline polyester resin can be easily dispersed uniformly in the toner. Moreover, using the dispersion assistant, it is possible to suppress the adhesion of the crystalline polyester resin to the surface of the toner.

Moreover, according to the method of manufacturing the toner of the embodiment of the present application, in the mixing step, the oil phase can include an active hydrogen group including compound and prepolymer. Thus, while generating the adhesive base material by the extension reaction and/or the crosslinking reaction for the active hydrogen group-including compound and the prepolymer, the toner base particles can be formed.

<Developer>

The developer according to the embodiment of the present application includes the toner according to the embodiment of the present application. The developer may include a carrier or the like, which is selected as necessary. Thus, the appropriate fluidity of the toner is secured even when the temperature is high and the humidity is high. Moreover, it is possible to transfer images with little contamination and perform the development. Accordingly, the developer having excellent environmental stability (reliability) can be provided.

The developer may be single component developer and may be two components developer. In the case of using for a high-speed printer, or the like, corresponding to the recent enhancement in the information processing speed, from a point of enhancing the lifetime of the printer, two components developer is preferably used.

In the case where the above-described developer is used as single component developer, even when an incoming and an outgoing of the toner is performed, the toner exhibits little variation in the particle size, little filming on the developing roller, and little adhesion to a member such as a blade that forms a thin layer of the toner. Thus, even when the toner is stirred for a long time, excellent and stable developing property and image are obtained.

In the case where the above-described developer is a two-component developer, even when an incoming and an outgoing of the toner is performed for a long time, variation in the particle size of the toner is small; and even when the toner is stirred for a long time in the developing device, excellent and stable developing property and image are obtained.

When the toner according to the embodiment of the present application is used as two-component developer, the toner is mixed with carriers, and used as the developer. The content of the carrier in the two-component developer can be appropriately determined according to a purpose. The content preferably is within a range from 90 pts mass to 98 pts mass, and more preferably is within a range from 93 pts mass to 97 pts mass, to 100 pts mass of the two components developer.

The developer according to the embodiment of the present application can preferably be used to form images using the conventional electrophotography, such as a magnetic monocomponent development method, a nonmagnetic monocomponent development method, or a two components development method.

[Carrier]

The carrier is not particularly limited, and can be selected appropriately according to a purpose. The carrier is preferably provided with a core and a resin layer (coating layer) that coats the core.

(Core)

The material use as the core is not particularly limited, and can be appropriately selected according to a purpose. Suitable materials of the core may include, for example, manganese-strontium based materials with a magnetization that is within a range from 50 emu/g to 90 emu/g, manganese-magnesium based materials with magnetization that is within a range from 50 emu/g to 90 emu/g. Moreover, to secure an image density, iron power with a magnetization of 100 emu/g or greater, and a high magnetization material such as magnetite with magnetization that is within a range from 75 emu/g to 120 emu/g are preferably used. Moreover, a low magnetization material such as copper-zinc based material with magnetization that is within a range from 30 emu/g to 80 emu/g is preferably used, because it is possible to relax the impact to the photoconductor of the developer, in a napping state, and it is advantageous for improving the image quality. The above-described materials may be used singly, or a combination of two or more materials may be used.

The volume average particle diameter of the core is not particularly limited, and can be appropriately determined according to a purpose. The volume average particle diameter preferably is within a range from 10 μm to 150 μm, and more preferably is within a range from 40 μm to 100 μm. When the volume average particle diameter is 10 μm or more, it is possible to effectively suppress problems such as increases in the amount of fine powders in the carrier, decreases in the magnetization per individual particle, and scattering of the carriers. When the volume average particle diameter is 150 μm, it is possible to effectively suppress problems such as decreases in the specific surface area, occurrence of scattering of the toner, and poor reproduction of solid image portion in a full-color image including a lot of solid image portions.

(Resin Layer)

A material of the resin layer is not particularly limited, and can be appropriately selected according to a purpose. Suitable materials may include, for example, amino resins, polyvinyl resins, polystyrene resins, polyhalogenated olefins, polyester resins, polycarbonate-based resins, polyethylenes, polyvinyl fluorides, polyvinylidene fluorides, polytrifluoroethylenes, polyhexafluoropropylenes, copolymers of vinylidene fluoride and acrylic monomer, copolymers of vinylidene fluoride and vinyl fluoride, fluoroterpolymers of polymer of tetrafluoroethylene, vinylidene fluorides and monomers that do not include fluoro group, silicone resins, and the like. The above-described resins may be used singly, or a combination of two or more resins may be used.

Suitable amino resins may include, for example, urea formaldehyde resins, melamine resins, benzoguanamine resins, urea resins, polyamide resins, epoxy resins, and the like.

Suitable polyvinyl resins may include, for example, acrylic resins, polymethyl methacrylates, polyacrylonitriles, polyvinyl acetates, polyvinyl alcohols, polyvinyl butyrals, and the like.

Suitable polystyrene resins may include, for example, polystyrenes, styrene-acryl copolymers, and the like.

Suitable polyhalogenated olefins may include, for example, polyvinyl chlorides and the like.

Suitable polyester resins may include, for example, polyethylene terephthalates, polybutylene terephthalates, and the like.

The resin layer may include conductive powder and the like, as necessary. The conductive powder is not particularly limited, and can be appropriately selected according to a purpose. Suitable conductive powers may include, for example, metal powders, carbon black including powders, titanium oxide powders, tin oxide powders, zinc oxide powders, and the like. The mean particle size of the conductive powder is preferably 1 μm or less. When the mean particle size is 1 μm or less, it is advantageous in controlling an electric resistance.

A method of forming the resin layer includes, for example, a step of dissolving silicone resin or the like in solvent to prepare an application liquid, a step of applying the application liquid onto a surface of the core, a step of drying the application liquid, and a step of baking to form the resin layer.

A method of applying the application liquid is not particularly limited, and can be appropriately selected according to a purpose. Suitable methods may include, for example, a dip coating method, a spraying method, a blush coating method, and the like.

The solvent is not particularly limited, and can be appropriately selected according to a purpose. Suitable solvents may include, for example, toluene, xylene, methyl ethyl ketone, methyl isobutyl ketone, butyl cellosolve acetate, and the like.

A method of baking may be an exterior heating method or an interior heating method. Specifically, a fixed type electric furnace, a fluid type electric furnace, a rotary type electric furnace, a burner furnace may be used, and a microwave may be used.

The content of the resin layer in the carrier is not particularly limited, and may be appropriately determined according to the desired application. The content preferably is within a range from 0.01 pts mass to 5.0 pts mass. When the content is 0.01 pts mass or more, uniform resin layer can be formed on the surface of the core. When the content is 5.0 pts mass or less, the resin layer is not too thick, and fusion of the carriers with each other is suppressed. Thus, the uniformity of the carriers can be enhanced.

<Toner Storage Unit>

A toner storage unit according to the embodiment of the present application can store the toner of the embodiment of the present application. The toner storage unit according to the embodiment of the present application refers to a unit provided with function of storing a toner and storing the toner. Modes of the toner storage unit include, for example, a toner storage container, a developing part, and a process cartridge.

The toner storage container refers to a container that stores a toner.

The developing part refers to a unit that stores a toner and has a developing means.

The process cartridge refers to a unit which is obtained by integrating at least an electrostatic latent image bearer (also referred to as an image bearer) and a developing means, stores a toner, and is attachable/detachable to/from an image forming apparatus. The process cartridge may be provided with at least one selected from a charging means, an exposure means, a clearing means, and the like.

The toner storage unit according to the embodiment of the present application stores the toner according to the embodiment of the present application. Because the toner storage unit according to the embodiment of the present application is mounted in the image forming apparatus that forms an image using the toner according to the embodiment of the present application, it is possible to provide a toner that is excellent in the low temperature fixing property, the heat resistant preservability, and the cleanability.

[Image Forming Apparatus]

The image forming apparatus according to the embodiment of the present application includes

- an electrostatic latent image bearer;
- an electrostatic latent image formation unit that forms an electrostatic latent image on the electrostatic latent image bearer; and
- a developing part that develops the electrostatic latent image formed on the electrostatic latent image bearer using a toner to form a toner image. The image forming apparatus can further be provided with another component, as necessary.

The image forming apparatus according to the embodiment of the present application more preferably includes a transfer unit that transfers the toner image to a recording medium and a fixing part that fixes a transfer image transferred on a surface of the recording medium, in addition to the above-described electrostatic latent image bearer, the electrostatic latent image formation unit and the developing part.

In the developing part, the toner according to the embodiment of the present application is used. Preferably, the toner image may be formed using developer including the toner according to the embodiment of the present application and further including the other components such as carriers, as necessary.

(Electrostatic Latent Image Bearer)

A material, a shape, a structure, a size, and the like of the electrostatic latent image bearer (also referred to as an "electrophotographic photoreceptor", or a "photoconductor") according to the embodiment of the present application are not particularly limited, and can be appropriately selected from the conventional ones. The materials of the electrostatic latent image bearer include, for example, an inorganic photoconductor such as amorphous silicon, or selenium, an organic photoconductor (OPC) such as polysilane, or phthal polymethine, and the like. Among them, the organic photoconductor (OPC) is preferable from a point that a high-definition image can be obtained. The shape of the electrostatic latent image bearer preferably includes a shape of drum.

(Electrostatic Latent Image Formation Unit)

The electrostatic latent image formation unit is not particularly limited as long as it is a means for forming an electrostatic latent image on the electrostatic latent image bearer, and can be appropriately selected according to a purpose. The electrostatic latent image formation unit according to the embodiment of the present application is provided with a charging member (electrification unit) that electrifies a surface of the electrostatic latent image bearer uniformly, and an exposure member (exposure unit) that exposes imagewise the surface of the electrostatic latent image bearer.

The electrification unit is not particularly limited, and can be appropriately selected according to the purpose. The electrification units include, for example, a contact charger provided with an electrically conductive or semiconductive roller, a blush, a film, a rubber blade, and the like; a non-contact charger utilizing corona discharge, such as a corotron, or a scorotron, and the like.

The electrification unit is preferably arranged in contact or non-contact state to the electrostatic latent image bearer, and electrifies the surface of the electrostatic latent image bearer by superimposing and applying direct current voltage and an alternating current voltage. Moreover, the electrification unit is preferably a charging roller arranged closely to the electrostatic latent image bearer non-contactly via a gap tape, and electrifies the surface of the electrostatic latent image bearer by superimposing and applying direct current voltage and an alternating current voltage to the charging roller.

The exposure unit is not particularly limited as long as it can expose with an image to be formed onto the surface of the electrostatic latent image bearer electrified by the electrification unit, and can be appropriately selected according to a purpose. The exposure units include, for example, various types of exposure units of a copying optical system, a rod lens array system, a laser optical system, a liquid crystal shutter optical system, and the like. Moreover, an optical backplane type of exposing imagewise from a back surface side of the electrostatic latent image bearer may be employed.

(Developing Part)

The developing part is not particularly limited as long as it can develop the above-described electrostatic latent image formed on the electrostatic latent image bearer and form a visible image, and can be appropriately selected according to a purpose. The developing part preferably can store a toner, and provide the toner to the electrostatic latent image contactly or non-contactly, for example. The developing part is preferably provided with a toner storage container.

The developing part may be a developing part for single color, or may be a multicolor developing part. For example, the developing part is preferably provided with a stirring device that performs friction stirring for a toner to electrify the toner, and a rotatable magnet roller.

(Transfer Unit)

The transfer unit is preferably provided with a primary transfer unit that transfers a visible image to an intermediate transfer body to form a composite transfer image, and a secondary transfer unit that transfers the composite transfer image to a recording medium. The intermediate transfer body is not particularly limited, and can be appropriately selected from conventional transfer bodies according to a purpose. For example, a transfer belt or the like is preferably used.

The transfer unit (the primary transfer unit and the secondary transfer unit) is preferably provided with at least a transfer device that peels and charges the visible image formed on the electrostatic latent image bearer (photoconductor) to the recording medium side. The transfer unit may be provided with a transfer device, or may be provided with two or more transfer devices.

The transfer devices include, for example, a corona transfer device using corona discharge, a transfer belt, a transfer roller, a pressure transfer roller, an adhesive transfer device, and the like. Moreover, the recording medium is not particularly limited, and can be appropriately selected from among conventional recording media (recording paper).

(Fixing Part)

The fixing part is not particularly limited, and can be appropriately selected according to a purpose. The fixing part is preferably a conventional heating and pressurizing device. The heating and pressurizing devices include, for example, a combination of a heating roller and a pressurizing roller, a combination of a heating roller, a pressuring roller and an endless belt, and the like.

The fixing part is preferably a heating and pressurizing unit that includes a heating body provided with a heating element, a film contacting the heating body, and a pressurizing member that pressure-contacts an object with the heating body via the film, and passes a recoding medium on which an unfixed image is formed between the film and the pressurizing member, so as to heat and fix the image. Typically, the heating temperature at the heating and pressuring unit preferably is within 80° C. to 200° C. In the embodiment of the present application, according to a purpose, with the fixing part or instead of the fixing part, a conventional optical fixing device may be used, for example.

(Others)

An image forming apparatus according to a primary mode may be provided with the other units, such as a discharging unit, a cleaning unit, a recycling unit, and a control unit.

((Discharging Unit))

The discharging unit is not particularly limited, and can be appropriately selected from among conventional discharging devices, as long as it can apply discharging bias to the electrostatic latent image bearer. The discharging units preferably include, for example, a discharging lamp and the like.

((Cleaning Unit))

The cleaning unit is not particularly limited as long as it can remove a toner remaining on the electrostatic latent image bearer, and can be appropriately selected from among conventional cleaners. The cleaners include, for example, a magnetic brush cleaner, an electrostatic brush cleaner, a magnetic roller cleaner, a blade cleaner, a brush cleaner, a web cleaner, and the like.

As described above, because the toner according to the primary mode is excellent in cleanability, the image forming apparatus according to the embodiment of the present application is provided with the cleaning unit. By applying the toner to the image forming apparatus with the cleaning unit, the cleanability can be enhanced. That is, by controlling an adhesion force between toners, fluidity of the toner is controlled, and the cleanability can be enhanced. Moreover, by controlling characteristic of the toner after deterioration, even under severe condition such as aged deterioration or high temperature and high humidity, the excellent cleanability can be maintained. Furthermore, because the external additive can be sufficiently released from the toner on the photoconductor, the high cleanability can be achieved by forming a deposition layer (a dam layer) of the external additive at a cleaning blade nip portion.

((Recycling Unit))

The recycling unit is not particularly limited, and can be selected from among conventional conveyance means.

((Control Unit))

The control unit can control operations of the above-described units, respectively. The control unit is not particularly limited as long as it can control the operations of the above-described units, respectively, and can be appropriately selected according to a purpose. The control unit includes, for example, a control device such as a sequencer, a computer, or the like.

Because the image forming apparatus according to the embodiment of the present application can form an image using the toner according to the embodiment of the present application, a high definition image can be provided stably while suppressing power consumption.

<Image Forming Method>

An image forming method according to the embodiment of the present application includes

- an electrostatic latent image forming step of forming an electrostatic latent image on an electrostatic latent image bearer;
- a developing step of developing the electrostatic latent image using a toner to form a toner image; and furthermore, as necessary,
- the other steps. The image forming method can be preferably performed by the above-described image forming apparatus, the electrostatic latent image forming step can be preferably performed by the above-described electrostatic latent image formation unit, the developing step can be preferably performed by the above-described developing part, and the other steps can be preferably performed by the above-described other units.

Moreover, the image forming method according to the embodiment of the present application more preferably includes a transferring step of transferring the toner image to a recording medium; and a fixing step of fixing a transfer image transferred onto a surface of the recording medium, in addition to the above-described electrostatic latent image forming step and the developing step.

In the developing step, the toner according to the embodiment of the present application is used. Preferably, the toner image is formed using developer including the toner according to the embodiment of the present application, and further including the other components such as carriers as necessary.

The electrostatic latent image forming step is a step of forming am electrostatic latent image on the electrostatic latent image bearer, and includes an electrification step of electrifying a surface of the electrostatic latent image bearer, and an exposure step of exposing the electrified surface of the electrostatic latent image bearer to form the electrostatic latent image. The electrification step can be performed by, for example, applying voltage to the surface of the electrostatic latent image bearer using the electrification unit. The exposure step is performed by exposing imagewise the surface of the electrostatic latent image bearer using the above-described exposure unit. The formation of the electrostatic latent image is performed by, for example, uniformly electrifying the surface of the electrostatic latent image bearer, and exposing imagewise the surface. The formation can be performed by the electrostatic latent image formation unit.

The developing step is a step of sequentially developing the electrostatic latent image with a plurality of colors of toners to form a visible image. The formation of the visible image can be performed by developing the electrostatic latent image using the above-described toner. The formation can be performed by the developing part.

In the developing part, for example, the toner and the carrier are mixed and stirred. According to friction, the toner is electrified, and held in a napping state on a surface of a rotating magnet roller, and a magnetic brush is formed. Because the magnet roller is arranged close to the electrostatic latent image bearer (photoconductor), a part of the toner configuring he magnetic brush formed on the surface of the magnetic roller moves to a surface of the electrostatic latent image bearer (photoconductor) according to an electrically attracting force. As a result, the electrostatic latent image is developed by the toner, and the visible image by the toner is formed on the surface of the electrostatic latent image bearer (photoconductor).

The transferring step is a step of transferring the visible image to a recording medium. In the transferring step, an intermediate transfer body is preferably used. The visible image is primarily transferred onto the intermediate transfer body, and the visible image is secondarily transferred onto the recording medium. The transferring step preferably includes a primary transfer step of transferring the visible image to the intermediate transfer body using a toner of two or more colors, preferably a full-color toner, to form a composite transfer image, and a secondary transfer step of transferring the composite transfer image onto the recording medium. The transferring step is performed by, for example, electrifying the visible image on the surface of the electrostatic latent image bearer (photoconductor) using a transferring and electrification unit. The transferring step can be performed by the transfer unit.

The fixing step is a step of fixing the visible image transferred on the recording medium using a fixing device. The fixing step may be performed each time a visible image is developed by developer of the plurality of colors of developers and transferred onto the recording medium. Alternatively, the fixing step may be performed at a time collectively and simultaneously for layered images for the respective developers.

The image forming method according to the primary mode may further include other steps appropriately selected as necessary, such as a discharging step, a cleaning step, or a recycling step.

The discharging step is a step of applying discharging bias to the electrostatic latent image bearer to perform discharging. The discharging step is preferably performed by the discharging unit.

The cleaning step is a step of removing the toner remaining on the electrostatic latent image bearer. The cleaning step is preferably performed by the cleaning unit.

The recycling step is a step of recycling the toner removed in the cleaning step to the developing part. The recycling step is preferably performed by the recycling unit.

Because the image forming method according to the embodiment of the present application can form an image using the toner according to the embodiment of the present application, high definition image can be provided stably while suppressing power consumption.

[A Mode of the Image Forming Apparatus]

Next, a mode of the image forming apparatus according to the embodiment of the present application will be described with reference to FIG. 1. FIG. 1 is a diagram schematically depicting an example of a configuration of the image forming apparatus according to the embodiment of the present application. As shown in FIG. 1, a color image forming apparatus 1 includes a photoconductor drum 10 which is an electrostatic latent image bearer; a charging roller 20 which is an electrification unit; an exposure device 30 which is an exposure unit; a developing device 40 which is a developing part; an intermediate transfer body (an intermediate transfer belt) 50; a cleaning device 60 which is a cleaning unit; a transfer roller 70 which is a transfer unit; a discharging lamp 80 which is a discharging unit; and an intermediate transfer body cleaning device 90.

The intermediate transfer body 50 is an endless belt stretched by three rollers 51 that are arranged inside the color image forming apparatus 1, and is designed so as to be moved in a direction indicated by an arrow by the three rollers 51. A part of the rollers 51 functions as a transfer bias roller that can apply predetermined transfer bias (a primary transfer bias) to the intermediate transfer body 50. The intermediate transfer body cleaning device 90 is arranged near the intermediate transfer body 50. Moreover, near the intermediate transfer body 50, the transfer roller 70 is arranged so as to oppose to the intermediate transfer body 50, and the transfer roller 70 can apply transfer bias (a secondary transfer bias) to the intermediate transfer body 50, so as to transfer (secondarily transfer) a developed image (a toner image) to a transfer paper P which is a recoding medium. Around the intermediate transfer body 50, a corona electrification unit 52 for giving electric charges to the toner image on the intermediate transfer body 50 is arranged between a contact part between the photoconductor drum 10 and the intermediate transfer body 50 and a contact part between the intermediate transfer body 50 and the transfer paper P, with respect to a rotational direction of the intermediate transfer body 50.

The developing device 40 includes a developing belt 41 which is a developer bearer; a black (Bk) developing unit 42K, a yellow (Y) developing unit 42Y, a magenta (M) developing unit 42M, and a cyan (C) developing unit 42C provided around the developing belt 41.

The developing belt 41 is an endless belt stretched by a plurality of belt rollers, and can be moved in a direction indicated by an arrow in the drawing. A part of the developing belt 41 comes in contact with the photoconductor drum 10.

The black developing unit 42K includes a developer storage part 421K, a developer supplying roller 422K, and a developing roller (a developer bearer) 423K. The yellow developing unit 42Y includes a developer storage part 421Y, a developer supplying roller 422Y, and a developing roller 423Y. The magenta developing unit 42M includes a developer storage part 421M, a developer supplying roller 422M, and a developing roller 423M. The cyan developing unit 42C includes a developer storage part 421C, a developer supplying roller 422C, and a developing roller 423C.

Next, a method of forming an image using the image forming apparatus 1 will be described. A surface of the photoconductor drum 10 is uniformly electrified using the charging roller 20, and the photoconductor drum 10 is exposed with exposure light L using the exposure device 30 to form an electrostatic latent image. Then, the electrostatic latent image formed on the photoconductor drum 10 is developed with a toner supplied from the developing device 40 to form a toner image. The toner image formed on the photoconductor drum 10 is transferred (primary transfer) onto the intermediate transfer body 50 according to transfer bias applied by the roller 51. Then, the toner image is further transferred (secondary transfer) onto a transfer paper P supplied from a paper feeding part (not shown) according to transfer bias applied by the transfer roller 70. The photoconductor drum 10, from which the toner image was transferred to the intermediate transfer body 50, is discharged by the discharging lamp 80, after a toner remaining on the surface of the photoconductor drum 10 is removed by the cleaning device 60. A toner remaining on the intermediate transfer body 50, after the toner image was transferred, is removed by the intermediate transfer body cleaning device 90.

After the above-described transfer process ends, the transfer paper P is conveyed to the fixing unit. At the fixing unit, the transferred toner image is fixed to the transfer paper P.

EXAMPLES

In the following, the embodiment of the present application will be described more specifically showing practical examples and comparative examples. However, the embodiment of the present application is not limited to the practical examples.

<Synthesis of Crystalline Polyester Resin A-1>

A 1,6-hexane diol and sebacic acid were charged in 4 neck flask of 5 L provided with a nitrogen introduction pipe, a dewatering pipe, an agitator, and a thermocouple, so that a ratio of hydroxyl groups (—OH) to carboxyl groups (—COOH), OH/COOH, was 1.1. The charged raw material was reacted with titanium tetraisopropoxide of 500 ppm with respect to a mass of the charged raw material while making water flow out, finally heated to a temperature of 235° C., and reacted for one hour. Then, the reaction was performed for six hours under the reduced pressure of 10 mmHg or lower. The temperature was set to 185° C. Trimellitic acid anhydride was added so that a molar ratio to carboxyl groups (—COOH) was 0.053, and the reaction was performed while stirring for two hours. According to the above-described reaction, a crystalline polyester resin A-1 was obtained. An acid number (Av), an SP value, a weight-average molecular weight (Mw), and a melting point (Tm) are shown in TABLE 1.

<Synthesis of Crystalline Polyester Resins A-2 to A-4>

Similar to the above-described synthesis of the crystalline polyester resin A-1, according to raw materials and synthesis conditions listed in TABLE 1, shown below, the crystalline polyester resins A-2 to A-4 were synthesized. Acid numbers (Av), SP values, molecular weights (Mw) and melting points (Tm) of the obtained crystalline polyester resins A-2 to A-4 are listed in TABLE 1.

TABLE 1

| | | A-1 | A-2 | A-3 | A-4 |
|---|---|---|---|---|---|
| Composition (pts mass) | 1, 10-decane diol | 0 | 0 | 0 | 114 |
| | 1, 6-hexane diol | 98 | 98 | 118 | 0 |
| | Dodecanedioic acid | 0 | 0 | 0 | 136 |
| | Sebacic acid | 152 | 152 | 0 | 0 |
| | Adipic acid | 0 | 0 | 132 | 0 |
| | Trimellitic acid anhydride | 3.9 | 0 | 3.8 | 4.0 |
| Acid number (Av) [mgKOH/g] | | 10 | 10 | 10 | 10 |
| SP value [$cal^{1/2}/cm^{3/2}$] | | 9.9 | 9.8 | 10.2 | 9.5 |
| Weight-average molecular weight (Mw) | | 9000 | 25000 | 5000 | 12000 |
| Melting point (Tm) [° C.] | | 62 | 67 | 52 | 78 |

<Preparation of Crystalline Polyester Resin Dispersion Liquid>

[Preparation of Crystalline Polyester Resin Dispersion Liquid A-1a]

The crystalline polyester resin A-1 (55 pts mass), methylethylketone (35 pts mass), and 2-propyl alcohol (10 pts mass) were charged in 4 neck flask. The raw material was stirred while being heated at the melting point temperature of the crystalline polyester resin A-1, and the crystalline polyester resin A-1 was dissolved. Then, aqueous ammonia solution of 28 mass % was added so that degree of neutralization was 200%. The degree of neutralization was obtained by the acid number of the crystalline polyester resin A-1. Furthermore, ion exchange water (130 pts mass) was gradually added, phase inversion emulsification was performed, and solvent was removed. Then, ion exchange water was added to adjust solid content concentration (a concentration of the crystalline polyester resin) to 25 mass %. Thus, the crystalline polyester resin dispersion liquid A-1a, which was toner binding resin dispersion, was obtained. A particle diameter of the crystalline polyester resin in the crystalline polyester resin dispersion liquid A-1a will be shown in TABLE 2.

[Preparation of Crystalline Polyester Resin Dispersion Liquid A-1b]

In the same manner as in the preparation of the crystalline polyester resin dispersion liquid A-1a, except that the degree of neutralization described in the preparation of the crystalline polyester resin dispersion liquid A-1a was changed to 500%, the crystalline polyester resin dispersion liquid A-1b was prepared. A particle diameter of the crystalline polyester resin in the crystalline polyester resin dispersion liquid A-1b will be shown in TABLE 2.

[Preparation of Crystalline Polyester Resin Dispersion Liquid A-1c]

A crystalline polyester resin (C) of 20 pts mass and ethyl acetate of 80 pts mass were charged in a reaction vessel provided with a cooling pipe, a thermometer, and agitator. Then, the raw material was heated to a temperature of 80° C., and the resin was dissolved. The raw material was cooled to a temperature of 30° C., and using an ultra visco mill of a beads mill (by AIMEX Co., Ltd.), with liquid sending speed of 1 kg/h, and a peripheral speed of disk of 6 m/s, zirconia beads having diameters of 0.5 mm were filled to 80 volume %, wet pulverization was performed under a condition of 6 paths, and ethyl acetate was added so that solid content concentration was 20%. Thus, the crystalline polyester resin dispersion liquid A-1c was prepared. A particle diameter of the crystalline polyester resin in the crystalline polyester resin dispersion liquid A-1c will be shown in TABLE 2.

[Preparation of Crystalline Polyester Resin Dispersion Liquids A-2a to A-4a]

In the same manner as in the preparation of the crystalline polyester resin dispersion liquid A-1a, crystalline polyester resin dispersion liquids A-2a to A-4a, which were dispersion liquids including crystalline polyester resins A-2 to A-4, respectively, were prepared. Particle diameters of the crystalline polyester resins in the crystalline polyester resin dispersion liquids A-2a to A-4a are shown in TABLE 2.

TABLE 2

| Crystalline polyester resin | | A-1 | | A-2 | A-3 | A-4 |
|---|---|---|---|---|---|---|
| Crystalline polyester resin dispersion liquid | A-1a | A-1b | A-1c | A-2a | A-3a | A-4a |
| Particle diameter of crystalline polyester resin in crystalline polyester resin dispersion liquid (nm) | 250 | 120 | 500 | 260 | 270 | 240 |

<Synthesis of Amorphous Polyester Resin B>

Bisphenol A ethylene oxide two-molar adduct (BisA-EO), bisphenol A propylene oxide three-molar adduct (BisA-PO), trimethylol propane (TMP), terephthalic acid, and adipic acid were charged in 4 neck flask provided with a nitrogen introduction pipe, a dewatering pipe, agitator, and a thermocouple. Contents of the bisphenol A ethylene oxide two-molar adduct, the bisphenol A propylene oxide three-molar adduct, and the trimethylol propane were adjusted so that a molar ratio (the bisphenol A ethylene oxide two-molar adduct/the bisphenol A propylene oxide three-molar adduct/the trimethylol propane) was 38.6/57.9/3.5. Contents of the terephthalic acid and the adipic acid were adjusted so that a molar ratio (the terephthalic acid/the adipic acid) was 80/20.

The contents were adjusted so that a ratio of hydroxyl groups to carboxyl groups, OH/COOH, was 1.2. The charged raw material was reacted with titanium tetraisopropoxide of 500 ppm with respect to a component of the resin at normal pressure, and a temperature of 230° C., for eight hours. The reaction was performed for four hours under the reduced pressure of 10 mmHg-15 mmHg. Trimellitic acid anhydride was added to the reaction vessel so that a molar ratio to all the resin components was 1 mol %, and the reaction was performed at normal pressure, and at a temperature of 180° C., for three hours. A solubility parameter value (SP value) of the amorphous polyester resin B was 11.2 $cal^{1/2}/cm^{3/2}$, a glass transition temperature Tg was 57.6° C., a weight-average molecular weight Mw was 10,000, and an acid number Av was 20.

<Synthesis of Prepolymer C>

As an alcohol component, 3-methyl-1,5-pentanediol of 97 mol %, and trimethylol propane (TMP) of 3 mol %; and as an acid component, adipic acid of 50 mol %, and terephthalic acid of 50 mol % were charged in a reaction vessel provided with a cooling pipe, agitator, and a nitrogen introduction pipe. The contents were adjusted so that a ratio of hydroxyl groups to carboxyl groups, OH/COOH, was 1.1. Furthermore, titanium tetraisopropoxide of 300 ppm with respect to a component of the resin was also charged. Then, the raw material was heated to temperature of 200° C. for about four hours, and heated to temperature of 230° C. for two hours, and the reaction was performed until outflow water is exhausted. Then, the reaction was performed under reduced pressure of 10 mmHg-15 mmHg for 5 hours. According to the above-described reaction, intermediate body polyester C-1 was obtained.

Next, the intermediate body polyester B-1 and isophoronediisocyanate (IPDI) were charged in a reaction vessel provided with a cooling pipe, agitator, and a nitrogen introduction pipe, so that a molar ratio of isocyanate groups of the IPDI to hydroxyl groups of the intermediate body polyester resin was 1.8. The raw material was diluted by ethyl acetate so as to be ethyl acetate solution of 48%. Then, the reaction was performed at a temperature of 100° C. for five hours. Thus, non-linear polyester resin C having a reactive group (prepolymer C) was obtained. A grass transition temperature Tg of the prepolymer C was −38.5° C., a weight-average molecular weight Mw was 12,000, and an acid number Av was 0.14.

<Synthesis of Vinyl Polymer Modified Polyester Resin D>

As raw material monomer of condensation polymerization-based resin, polyoxypropylene(2.2)-2,2-(4-hydroxyphenyl) propane of 1225 g, polyoxyethylene(2.0)-2,2-(4-hydroxyphenyl) propane of 485 g, terephthalic acid of 345 g, iso dodecenyl succinic acid of 250 g, and as esterification catalyst, dibutyltin oxide of 5 g were subjected to condensation polymerization in nitrogen atmosphere at temperature of 230° C. for six hours. Then, the raw material was cooled to temperature of 150° C. Trimellitic acid of 175 g was added to reaction vessel. Then, a mixture of, as raw material monomer of addition polymerization-based resin, styrene of 400 g, 2-ethylhexyl acrylate of 55 g, as a bireactive compound, acrylic acid of 35 g, and as polymerization initiator, dicumyl peroxide of 25 g, was dropped while being stirred at a temperature of 160° C. for an hour. An addition polymerization reaction was performed while maintaining the temperature for one hour more. Then, the raw material was heated to a temperature of 200° C., a condensation polymerization reaction was performed, and thereby the vinyl polymer modified polyester resin D, which was hybrid resin of styrene acrylic resin and polyester resin, was obtained. A glass transition temperature Tg of the vinyl polymer modified polyester resin D was 60° C., and an acid number Av was 21 mgKOH/g.

Practical Example 1

[Manufacturing of Toner]

(Preparation of Master Batch (MB))

Water of 600 pts mass, carbon black (Nipex 60, by Degussa AG) of 500 pts mass, and the amorphous polyester resin B of 500 pts mass were mixed using Henschel mixer by Mitsui mining Co., Ltd.). The mixture was kneaded using twin rolls at a temperature of 150° C. for 30 minutes, roll-cooled, pulverized by a pulverizer, and thereby the master batch was obtained.

(Synthesis of Organic Particulate Emulsion (Fine Particle Dispersion Liquid))

Water of 683 pts mass, sodium salt of ethylene methacrylate oxide adduct sulfuric ester (Eleminol RS-30, by Sanyo chemical industries, Ltd.) of 11 pts mass, styrene of 138 pts mass, methacrylic acid of 138 pts mass, and ammonium persulfate of 1 pts mass were charged. By stirring at rotational speed of 400 rpm for 15 minutes, white emulsion was obtained. The emulsion was heated to a temperature in the system of 75° C., and a reaction was performed for five hours. An aqueous solution of ammonium persulfate of 1; of 30 pts mass was added, aged at a temperature of 75° C. for five hours, and thereby an aqueous dispersion liquid (fine particle dispersion liquid) of vinyl-based resin (a copolymer of sodium salt of styrene-methacrylic acid-ethylene methacrylate oxide adduct sulfuric ester) was obtained. The fine particle dispersion liquid was adjusted so that a solid content was 30%. A volume-average particle diameter obtained by measuring the fine particle dispersion liquid using laser diffraction/scattering particle size distribution measuring device LA-920 (by HORIBA Ltd.) was 0.14 μm.

(Preparation of Water Phase)

Water of 930 pts mass, the fine particle dispersion liquid of 67 pts mass, an aqueous solution of dodecyl diphenyl ether sodium disulphonate of 48.5% (Eleminol MON-7, by Sanyo chemical industries, Ltd.) of 103 pts mass, and ethyl acetate of 80 pts mass were mixed and stirred, and thereby milky-white liquid was obtained. The obtained liquid was set to a water phase.

(Preparation of Wax Dispersion Liquid)

An ester wax, as a release agent, of 100 pts mass (by NOF Corporation, WEP-3, with a melting point of 70° C., and an acid number of 0.1 mgKOH/g), and ethyl acetate of 400 pts mass were charged to a vessel in which a stirring rod and a thermometer were set. The mixture was heated to a temperature of 80° C. while stirring, maintained at the temperature of 80° C. for five hours, and cooled to a temperature of 20° C. for an hour, and dispersion was performed using a beads mill (an ultra visco mill, by AIMEX Co., Ltd.), with a liquid sending speed of 1 kg/h, and peripheral speed of disk of 6 m/s, zirconia beads having diameters of 0.5 mm were filled to 80 volume-, under condition of 3 paths, and thereby the wax dispersion liquid was obtained. The obtained wax dispersion liquid was adjusted so that a content of solid was 20%.

(Preparation of Oil Phase)

An ethyl acetate, the wax dispersion liquid, the amorphous polyester resin B, the vinyl polymer modified polyester resin D, and the master batch with the amounts listed below were charged in a vessel, and uniformly dissolved and dispersed using a TK homomixer (by Tokushu Kika Kogyo Co., Ltd.) with rotation speed of 5000 rpm. Then, isophorone diamine (IPDA) of quantity, so that a molar ratio of amino groups of the IPDA to isocyanate groups of an ethyl acetate solution of the prepolymer C ($NH_2$/NCO) was 0.98, was added, and stirred using the TK-type homomixer at rotation speed of 6000 rpm for 15 seconds. Furthermore, the crystalline polyester resin dispersion liquid A-1a of an amount listed below was gradually added while mixing for 15 minutes. Moreover, an ethyl acetate solution of the prepolymer C was added with an amount listed below, mixed using the TK homomixer (by Tokushu Kika Kogyo Co., Ltd.) with rotation speed of 5000 rpm for one minute, and thereby the oil phase was obtained.

((Blending Amount))

Ethyl acetate: 60.5 pts mass;

Wax dispersion liquid: 90 pts mass;

Amorphous polyester resin B: 132 pts mass;

Vinyl polymer modified polyester resin D: 45 pts mass;

Master batch: 30 pts mass;

Crystalline polyester resin dispersion liquid A-1a: 180 pts mass; and

Ethyl acetate solution of prepolymer C: 62.5 pts mass.

(Emulsification and Desolvation)

The oil phase was added to the vessel in which the water phase of 1000 pts mass was charged, and the oil phase and the water phase were mixed using the TK homomixer with rotation speed of 13000 rpm for 3 minutes, and an emulsion slurry was obtained. The volume average particle diameter after the desolvation was adjusted to 5 μm. The emulsion slurry was charged in a vessel in which a stirring device and a thermometer were set, subjected to the desolvation at a temperature of 30° C. for eight hours, aged at a temperature of 45° C. for four hours, and thereby dispersion slurry was obtained.

(Washing and Drying)

The dispersion slurry of 100 pts mass was subjected to vacuum filtration, and two cycles of the following operations from (1) to (4), and a filtered cake was obtained:

(1) adding ion exchange water of 100 pts mass to a filtered cake, mixing them using the TK homomixer (with rotation speed of 12,000 rpm for 10 minutes), and filtrating them;

(2) adding an aqueous solution of sodium hydroxide of 10% of 100 pts mass to the filtered cake of (1), mixing them using the TK homomixer (with rotation speed of 12,000 rpm for 30 minutes), and performing the vacuum filtration for them;

(3) adding hydrochloric acid of 10% of 100 pts mass to the filtered cake of (2), mixing them using the TK homomixer (with rotation speed of 12,000 rpm for 10 minutes), and filtering then; and (4) adding ion exchange water of 300 pts mass to the filtered cake of (3), and mixing them using the TK homomixer (with rotation speed of 12,000 rpm for 10 minutes).

Next, the filtered cake obtained as above was dried at a temperature of 45° C. for 48 hours by a circulating drier, sieved by a mesh with a mesh opening of 75 μm, and thereby toner base particles were obtained.

(Externally Adding Process)

The toner base particles, hydrophobic silica having an average particle diameter of 100 nm (QSG-100A, by Shin-Etsu Chemical Co., Ltd.), titanium oxide having an average particle diameter of 20 nm (JR-405, by TAYCA corporation), fine powders of hydrophobic silica having an average particle diameter of 15 nm (HDK-2000H, by Clariant AG) of blending amounts, shown below, were mixed using a Henschel mixer, and thereby toner was obtained.

((Blending Amounts))

The toner base particles: 100 pts mass;

The hydrophobic silica having an average particle diameter of 100 nm: 0.6 pts mass;

The titanium oxide having an average particle diameter of 20 nm: 1.0 pts mass; and Fine powders of the hydrophobic silica having an average particle diameter of 15 nm: 0.8 pts mass.

For the toner obtained as above, a content of crystalline polyester resin; a temperature To; a ratio of a storage modulus of the toner G' ($T_o$) at a temperature $T_o$ to the storage modulus of the toner G' ($T_o$+3) at a temperature To+3, G' (To)/G' (To+3); a shape factor of the crystalline polyester resin, SF1; the storage modulus G'(100) of the toner at a temperature of 100° C.; and an endothermic amount derived from the crystalline polyester resin in the first temperature increase of the toner, were measured as follows.

[Content of Crystalline Polyester Resin]

The content of the crystalline polyester resin was measured using gas chromatography mass spectrometer (GCMS). Measurement condition is shown below:

(Measurement Condition)

A measurement device: a quadrupole type mass spectrometer (QP2010, by Shimadzu Corporation), and a heating furnace (Py-3030D, by Frontier Laboratories Ltd.);

A micropot: SPV100 straight vial (2.5×1.9×10 mm);

A crystal glass wool; high purity silica ($SiO_2$) alkali free;

A reaction reagent: methanol solution of tetramethyl ammonium hydroxide (TMAH) of 2 μL;

A reaction heat temperature: 360° C.;

A carrier gas: high purity helium gas of G2 grade (He);

A separation column: capillary column of low polarity type (Ultra ALLOY$^+$-5:UA5-30M-0.25F, by Frontier Laboratories Ltd.);

A temperature of an oven: 50° C. (retention time: 1 minute), temperature increase (15° C./minute), and 330° C. (retention time: 5 minutes);

An ionization method: electron ionization (EI);

An ionization voltage: 70 eV;

A temperature of an ion source: 260° C.; and

A detection range of mass: 30 m/z-700 m/z.

[Temperature to, G' (To)/G' (To+3)]

The storage modulus G' (To) and the storage modulus G' (To+3) were obtained by measuring using dynamic viscoelasticity measuring device (ARES-G2, by TA Instruments, Inc.). A measurement sample is formed into a shape of a pellet with a diameter of 8 mm, and a thickness of 1-2 mm, and fixed to a parallel plate with a diameter of 8 mm. In the dynamic viscoelasticity measuring device, the sample formed as above was stabilized at a temperature of 40° C. Then, the storage modulus was measured by raising the temperature to 200° C. at a rate of 2.0° C. per minute, with a frequency of 1 Hz (6.28 rad/s) and a distortion amount of 0.1% (a distortion amount control mode). The temperature To is determined to be a temperature at which the storage modulus drastically changes.

[Shape Factor of the Crystalline Polyester Resin SF1]

The resulting toner was embedded in epoxy resin or the like and cured. Then, an ultrathin slice sample of the toner with a thickness of around 100 nm was prepared using ultramicrotome (ULTRACUT UCT, using a diamond knife, by Leica GmbH). Then, the sample is exposed in gas using ruthenium tetroxide, osmium tetroxide, or other staining agents, or the like, to stain the sample so as to identify a part of the crystalline polyester resin and the other parts.

The exposure time is appropriately adjusted according to contrast at the time of the observation. The ultrathin slice sample was observed using a transmission electron microscope (TEM). An observed cross section image was subjected to a binarization processing by a commercially available image processing software (e.g. Image-Pro plus), and a maximum length and a projected area of the crystalline polyester resin were calculated. The above-described observation was performed for 50 toners, and the maximum lengths of the crystalline polyester resins included in the respective toners are obtained. An average of the maximum lengths is defined to be the maximum length of the crystalline polyester resin in the embodiment of the present application.

The shape factor SF1 of the crystalline polyester resin was calculated using the maximum length and the projected area of the crystalline polyester resin, obtained as above, by the formula (2).

$$SF1=(L^2/A)\times(\pi/4)\times100 \quad (2)$$

where L represents the maximum length of the crystalline polyester resin, and A represents the projected area of the crystalline polyester resin.

[Storage Modulus G' (100) of the Toner at a Temperature of 100° C.]

The storage modulus G' (100) was measured using a dynamic viscoelasticity measuring device (ARES-G2 by TA Instruments, Inc.).

[Endothermic Amount Derived from the Crystalline Polyester Resin in the First Temperature Increase of the Toner]

The toner of about 5.0 mg, which was an objective sample, was put in a sample vessel made of aluminum, and the sample vessel was placed on a holder unit and set in an electric furnace. Then, the sample vessel was heated under a nitrogen atmosphere from −80° C. to 150° C. at a rate of 10° C./min (first temperature increase). Then, the sample vessel was cooled from 150° C. to −80° C. at a temperature falling rate of 10° C./min, and heated again to 150° C. at a rate of 10° C./min (second temperature increase). In each of the first and second temperature increases, a DSC curve was measured using a differential scanning colorimeter (DSC) system (Q-200, by TA Instruments, Inc.).

The DSC curve for the first temperature increase was selected from the obtained DSC curves, and the endothermic amount derived from the crystalline polyester resin in the first temperature increase of the toner was obtained using an analysis program in the differential scanning colorimeter system.

Results of measurements for the characteristics of the toner are shown in TABLE 3.

TABLE 3

| | Crystalline polyester resin dispersion liquid | Content of crystalline polyester resin [mass %] | $T_o$ [° C.] | G' ($T_o$)/G' ($T_o$ + 3) | Shape factor SF1 of crystalline polyester resin | Storage modulus G' of toner at 100° C. [ Pa] | Endothermic amount derived from crystalline polyester resin in first temperature increase of toner [J/g] |
|---|---|---|---|---|---|---|---|
| Ex. 1 | A-1a | 15 | 58 | 65 | 125 | 1000 | 17 |
| Ex. 2 | A-1a | 10 | 58 | 27 | 124 | 2400 | 12 |
| Ex. 3 | A-1b | 15 | 58 | 80 | 134 | 750 | 12 |
| Ex. 4 | A-1b | 10 | 58 | 40 | 132 | 2000 | 9 |
| Ex. 5 | A-2a | 15 | 62 | 13 | 117 | 2700 | 23 |
| Ex, 6 | A-2a | 10 | 62 | 10 | 120 | 3500 | 16 |
| Ex, 7 | A-3a | 8 | 51 | 20 | 133 | 1200 | 5 |
| Ex. 8 | A-1a | 20 | 58 | 130 | 129 | 480 | 24 |
| Comp. Ex. 1 | A-3a | 10 | 48 | 30 | 135 | 1000 | 6 |
| Comp. Ex. 2 | A-4a | 10 | 74 | 18 | 117 | 10000 | 17 |
| Comp. Ex. 3 | A-1c | 15 | 58 | 9 | 147 | 3200 | 9 |

Practical Example 2

A toner was prepared in the same manner as in the practical example 1, except that the blending amount of the ethyl acetate was changed to 105.5 pts mass, the blending amount of the amorphous polyester resin B was changed to 162 pts mass, the blending amount of the vinyl polymer modified polyester resin D was changed to 30 pts mass, and the blending amount of the crystalline polyester resin dispersion liquid A-1a was changed to 120 pts mass in the preparation of the oil phase. The blending amounts of the respective components used in the preparation of the oil phase were as follows.

((Blending Amount))

Ethyl acetate: 105.5 pts mass;
Wax dispersion liquid: 90 pts mass;
Amorphous polyester resin B: 162 pts mass;
Vinyl polymer modified polyester resin D: 30 pts mass;
Master batch: 30 pts mass;
Crystalline polyester resin dispersion liquid A-1a: 120 pts mass; and
Ethyl acetate solution of prepolymer C: 62.5 pts mass.

Practical Example 3

A toner was prepared in the same manner as in the practical example 1, except that the crystalline polyester resin dispersion liquid A-1a was changed to the crystalline polyester resin dispersion liquid A-1b in the preparation of the oil phase.

Practical Example 4

A toner was prepared in the same manner as in the practical example 1, except that the blending amount of the ethyl acetate was changed to 105.5 pts mass, the bending amount of the amorphous polyester resin B was changed to 162 pts mass, the blending amount of the vinyl polymer modified polyester resin D was changed to 30 pts mass, and the crystalline polyester resin dispersion liquid A-1a was changed to the crystalline polyester resin dispersion liquid A-1b with the blending amount of 120 pts mass in the preparation of the oil phase. The blending amounts of the respective components used in the preparation of the oil phase were as follows.

((Blending Amount))

Ethyl acetate: 105.5 pts mass;
Wax dispersion liquid: 90 pts mass;
Amorphous polyester resin B: 162 pts mass;
Vinyl polymer modified polyester resin D: 30 pts mass;
Master batch: 30 pts mass;
Crystalline polyester resin dispersion liquid A-1b: 120 pts mass; and
Ethyl acetate solution of prepolymer C: 62.5 pts mass.

Practical Example 5

A toner was prepared in the same manner as in the practical example 1, except that the crystalline polyester resin dispersion liquid A-1a was changed to the crystalline polyester resin dispersion liquid A-2a in the preparation of the oil phase.

Practical Example 6

A toner was prepared in the same manner as in the practical example 1, except that the blending amount of the ethyl acetate was changed to 105.5 pts mass, the blending amount of the amorphous polyester resin B was changed to 162 pts mass, the blending amount of the vinyl polymer modified polyester resin D was changed to 30 pts mass, and the crystalline polyester resin dispersion liquid A-1a was changed to the crystalline polyester resin dispersion liquid A-2a with the blending amount of 120 pts mass in the preparation of the oil phase. The blending amounts of the respective components used in the preparation of the oil phase were as follows.

((Blending Amount))

Ethyl acetate: 105.5 pts mass;
Was dispersion liquid: 90 pts mass;
Amorphous polyester resin B: 162 pts mass;
Vinyl polymer modified polyester resin D: 30 pts mass;
Master batch: 30 pts mass;
Crystalline polyester resin dispersion liquid A-2a: 120 pts mass; and
Ethyl acetate solution of prepolymer C: 62.5 pts mass.

Practical Example 7

A toner was prepared in the same manner as in the practical example 1, except that the blending amount of the ethyl acetate was changed to 123.5 pts mass, the blending amount of the amorphous polyester resin B was changed to 174 pts mass, the blending amount of the vinyl polymer modified polyester resin D was changed to 24 pts mass, and the crystalline polyester resin dispersion liquid A-1a was changed to the crystalline polyester resin dispersion liquid A-3a with the blending amount of 96 pts mass in the preparation of the oil phase. The blending amounts of the respective components used in the preparation of the oil phase were as follows.

((Blending Amount))

Ethyl acetate: 123.5 pts mass;
Wax dispersion liquid: 90 pts mass;
Amorphous polyester resin B: 174 pts mass;
Vinyl polymer modified polyester resin D: 24 pts mass;
Master batch: 30 pts mass;
Crystalline polyester resin dispersion liquid A-3a: 96 pts mass; and
Ethyl acetate solution of prepolymer C: 62.5 pts mass.

Practical Example 8

A toner was prepared in the same manner as in the practical example 1, except that the blending amount of the ethyl acetate was changed to 15.5 pts mass, the blending amount of the amorphous polyester resin B was changed to 102 pts mass, the blending amount of the vinyl polymer modified polyester resin D was changed to 60 pts mass, and the blending amount of the crystalline polyester resin was changed to 240 pts mass in the preparation of the oil phase. The blending amounts of the respective components used in the preparation of the oil phase were as follows.

((Blending Amount))

Ethyl acetate: 15.5 pts mass;
Wax dispersion liquid: 90 pts mass;
Amorphous polyester resin B: 102 pts mass;
Vinyl polymer modified polyester resin D: 60 pts mass;
Master batch: 30 pts mass;
Crystalline polyester resin dispersion liquid A-1a: 240 pts mass; and
Ethyl acetate solution of prepolymer C: 62.5 pts mass.

Comparative Example 1

A toner was prepared in the same manner as in the practical example 1, except that the blending amount of the ethyl acetate was changed to 105.5 pts mass, the blending amount of the amorphous polyester resin B was changed to 162 pts mass, the bending mount of the vinyl polymer modified polyester resin D was changed to 30 pts mass, and the crystalline polyester resin dispersion liquid A-1a was changed to the crystalline polyester resin dispersion liquid A-3a with the blending amount of 120 pts pass in the preparation of the oil phase. The blending amounts of the respective components used in the preparation of the oil phase were as follows.

((Blending Amount))

Ethyl acetate: 105.5 pts mass;
Wax dispersion liquid; 90 pts mass;
Amorphous polyester resin B: 162 pts mass;
Vinyl polymer modified polyester resin D: 30 pts mass;
Master batch: 30 pts mass;
Crystalline polyester resin dispersion liquid A-3a: 120 pts mass; and
Ethyl acetate solution of prepolymer C: 62.5 pts mass.

Comparative Example 2

A toner was prepared in the same manner as in the practical example 1, except that the blending amount of the ethyl acetate was changed to 105.5 pts mass, the blending amount of the amorphous polyester resin B was changed to 162 pts mass, the blending amount of the vinyl polymer modified polyester resin D was changed to 30 pts mass, and the crystalline polyester resin dispersion liquid A-1a was changed to the crystalline polyester resin dispersion liquid A-4a with the blending amount of 120 pts mass in the preparation of the oil phase. The blending amounts of the respective components used in the preparation of the oil phase were as follows.

((Blending Amount))

Ethyl acetate: 105.5 pts mass;

Wax dispersion liquid: 90 pts mass;

Amorphous polyester resin B: 162 pts mass;

Vinyl polymer modified polyester resin D: 30 pts mass;

Master batch: 30 pts mass;

Crystalline polyester resin dispersion liquid A-4a: 120 pts mass; and

Ethyl acetate solution of prepolymer C: 62.5 pts mass.

Comparative Example 3

A toner was prepared in the same manner as in the practical example 1, except that the blending amount of the ethyl acetate was changed to 15.5 pts mass, and the crystalline polyester resin dispersion liquid A-1a to the crystalline polyester resin dispersion liquid A-1c with the blending amount of 225 pts mass in the preparation of the oil phase. The blending amounts of the respective components used in the preparation of the oil phase were as follows.

((Blending Amount))

Ethyl acetate: 15.5 pts mass;

Wax dispersion liquid: 90 pts mass;

Amorphous polyester resin B: 132 pts mass;

Vinyl polymer modified polyester resin D: 45 pts mass;

Master batch: 30 pts mass;

Crystalline polyester resin dispersion liquid A-1c: 225 pts mass; and

Ethyl acetate solution of prepolymer C: 62.5 pts mass.

<Preparation of Carrier>

A resin layer coating liquid was prepared by adding silicone resin (organo straight silicone) of 100 pts mass, γ-(2-aminoethyl) aminopropyl trimethoxy silane of 5 pts mass, and carbon black of 10 pts mass to toluene of 100 pts mass, and dispersing them for 20 minutes using a homomixer. Using a fluidized bed type coating device, the resin layer coating liquid was applied on surfaces of spherical magnetite particles with an average diameter of 50 μm of 1000 pts mass, and thereby the carrier was prepared.

<Preparation of Developer>

Using a ball mill device, the toner of 5 pts mass and the carrier of 95 pts mass were mixed for each color, and thereby the developer was prepared for each color.

<Evaluation of Characteristics of the Toner>

Using the toners and developers for the respective colors, the following characteristics were evaluated.

[Low Temperature Fixing Property]

The respective developers were charged in a color laser multifunction printer (imagio MP C4300, by Ricoh Co., Ltd.), and a rectangular solid image of size of 2 cm×15 cm was formed on a sheet of plain paper (PPC paper type 6000 <70W>, A4 size, and a vertical grain type, by Ricoh Co., Ltd.), so that a toner deposition amount was 0.40 mg/$cm^2$. Then, a temperature of a surface of a fixing roller was changed, and a cold offset temperature (the lower limit of fixing temperature) at which, an offset in which an image remaining after the developing of the solid image was fixed at a position other than the desired position occurred, was obtained. The low temperature fixing property was evaluated according to evaluation criteria shown below.

(Evaluation Criteria)

A: the lower limit of the fixing temperature is lower than 105° C.;

B: the lower limit of the fixing temperature is higher than or equal to 105° C., and lower than 115° C.;

C: the lower limit of the fixing temperature is higher than or equal to 115° C., and lower than 125° C.; and D: the lower limit of the fixing temperature is higher than or equal to 125° C.

[Heat Resistant Preservability]

The toner of 10 g was charged in a glass vessel of 50 mL, and the glass vessel was tapped sufficiently so that change in an apparent density of the toner powder was not observed, and covered with a lid. The vessel was left in a thermostatic chamber at a temperature of 50° C. for 24 hours. Then, according to a penetration test (JIS K2235-1991), penetration (unit in mm) was measured, and based on evaluation criteria shown below, the heat resistant preservability was evaluated. The more the penetration is, the more excellent the heat resistant preservability is. The toner with the penetration less than 10 mm has high possibility of occurrence of a problem when using.

(Evaluation Criteria)

A: the penetration is greater than or equal to 20 mm;

B: the penetration is greater than or equal to 15 mm, and less than 20 mm;

C: the penetration is greater than or equal to 10 mm, and less than 15 mm; and

D: the penetration is less than 10 mm.

[Cleanability]

Using a color production printer (RICOH Pro C7210S, by RICOH Co., Ltd.), on a coated paper (POD gloss coated paper, by Oji Corporation), a standard line chart image for evaluation with resolution of 400 dpi (output image) was formed. The output image was formed so that a solid black image having a pattern of lines was generated. Then, using a cleaning blade after producing about one hundred thousand images, ten solid images were output. On outputting the solid images, the transfer bias of the secondary transfer was not applied, and nearly the entire amount of toner that had not been transferred was deposited on the cleaning blade. Then, after outputting a normal solid image, a blank image was generated. Dirt in the blank image was evaluated according to evaluation criteria shown below. The result of evaluation of C or higher represents practically usable level.

(Evaluation Criteria)

A: toner cannot be found in a blank sheet of paper;

B: a thin vertical line can be observed in a blank sheet of paper using a loupe;

C: one or two thin vertical lines can be observed visually in a blank sheet of paper; and D: three or more continuous thick vertical lines can be observed visually in a blank sheet of paper.

[Comprehensive Evaluation]

A comprehensive evaluation was performed based on evaluation criteria shown below. When all the evaluation items were A or B, the comprehensive evaluation was A. When one item C was included but there was no problem practically, the comprehensive evaluation was B. When two or more items C were included but there was no problem practically, the comprehensive evaluation was C. When one or more items D were included, the comprehensive evaluation was D.

(Evaluation Criteria)

A: excellent;

B: good;

C: withstanding practical use; and

D: not withstanding practical use.

The results of the above-described evaluations are listed in TABLE 4.

TABLE 4

| | LOW temperature fixing property | Heat resistant preservability | Cleanability | Comprehensive evaluation |
|---|---|---|---|---|
| Ex. 1 | A | B | B | A |
| Ex. 2 | B | B | B | A |
| Ex. 3 | A | C | B | B |
| Ex. 4 | B | B | C | B |
| Ex. 5 | A | B | A | A |
| Ex. 6 | C | B | A. | B |
| Ex. 7 | C | C | C | C |
| Ex. 8 | A | C | C | C |
| Comp. Ex. 1 | D | D | D | D |
| Comp. Ex. 2 | B | A | C | D |
| Comp. Ex. 3 | | B | D | D |

From TABLE 4, the toners according to the practical examples 1 to 8 were found to satisfy the practical conditions for the low temperature fixing property, the heat resistant preservability and the cleanability. On the other hand, the toners according to the comparative examples 1 to 3 were found not to satisfy at least one of the practical conditions for the low temperature fixing property, the heat resistant preservability, and the cleanability, and have a problem practically.

Accordingly, the toners of the practical examples 1 to 8 are different from the toners of the comparative examples 1 to 3, have the feature that G' ($T_o$)/G' ($T_o$+3) is within a range from 10 to 130 where the temperature $T_o$ is within a range from 51° C. to 62° C., and thereby are high-quality toners excellent in the low temperature fixing property, the heat resistant preservability and the cleanability.

Specific embodiments of the invention have been described above, however, it should be understood that the above-described embodiments are provided only as examples, that the present invention is not limited to the particulars of the described embodiments. The above-described embodiments can be implemented in other various modes, and various variations, modifications, replacements, additions, deletions, and combinations may be made without departing from the scope of the present disclosure. The embodiments and their variations belong to the scope of the present invention and abstract, and also belong to the invention recited in claims and equivalents thereof.

What is claimed is:

1. A toner comprising:

a crystalline polyester resin; and an amorphous polyester resin, wherein a ratio of a storage modulus of the toner G'(To) at a temperature To to the storage modulus of the toner G'(To+3) at a temperature To+3 is greater than or equal to 10, in a case where the temperature To is within a range from 50° C. to 65° C., wherein To is a temperature at which the toner starts to melt, and wherein the storage modulus of the toner G'(100) at a temperature of 100° C. is less than 1000 Pa.

2. The toner according to claim 1, wherein a content of the crystalline polyester resin is less than or equal to 15 mass %.

3. The toner according to claim 1, wherein a shape factor SF1 of the crystalline polyester resin in a cross-sectional view of the toner is greater than or equal to 100 and less than 130.

4. The toner according to claim 1, wherein an endothermic amount derived from the crystalline polyester resin in a first temperature increase of the toner is greater than or equal to 10 J/g, wherein the endothermic amount is an amount measured with differential scanning calorimetry comprising heating the toner under nitrogen from −80° C. to 150° C. at a rate of 10° C./min.

5. The toner according to claim 1 further comprising:

a vinyl polymer modified polyester resin that is obtained by modifying a crystalline polyester resin using either styrene or (meth) acrylic compound or using both the styrene and the (meth) acrylic compound.

6. A method of manufacturing the toner according to claim 1 comprising:

mixing an aqueous dispersion including a crystalline polyester resin into an oil phase including an amorphous polyester resin, to prepare a water-in-oil type (W/O type) emulsion in which the crystalline polyester resin is included in a state of being dispersed in the oil phase; and preparing an oil-in-water type (O/W type) emulsion in which the crystalline polyester resin is included in a state of being dispersed in an aqueous medium, by mixing the water-in-oil type (W/O type) emulsion into the aqueous medium.

7. A toner storage unit for storing the toner according to claim 1.

8. An image forming apparatus comprising:

an electrostatic latent image bearer;

an electrostatic latent image formation unit that forms an electrostatic latent image on the electrostatic latent image bearer;

a developing unit that develops the electrostatic latent image using the toner according to claim 1, to form a visible image;

a transfer unit that transfers the visible image to a recording medium, to form a transfer image on a surface of the recording medium; and a fixing unit that fixes the transfer image on the surface of the recording medium.

9. A method of forming an image comprising:

forming an electrostatic latent image on an electrostatic latent image bearer;

developing the electrostatic latent image using the toner according to claim 1 to form a visible image;

transferring the visible image to a recording medium to form a transfer image on a surface of the recording medium; and fixing the transfer image on the surface of the recording medium.

10. The toner according to claim 2, wherein a shape factor SF1 of the crystalline polyester resin in a cross-sectional view of the toner is greater than or equal to 100 and less than 130.

11. The toner according to claim 2, wherein an endothermic amount derived from the crystalline polyester resin in a first temperature increase of the toner is greater than or equal to 10 J/g, wherein the endothermic amount is an amount measured with differential scanning calorimetry comprising heating the toner under nitrogen from −80° C. to 150° C. at a rate of 10° C./min.

12. The toner according to claim 4, wherein the endothermic amount derived from the crystalline polyester resin in the first temperature increase of the toner is greater than or equal to 10 J/g and less than or equal to 24 J/g.

* * * * *